United States Patent
Kremin et al.

(10) Patent No.: US 9,658,720 B2
(45) Date of Patent: May 23, 2017

(54) CAPACITIVE SENSE ARRAY FOR DETECTING PASSIVE TOUCH OBJECTS AND AN ACTIVE STYLUS

(75) Inventors: Viktor Kremin, Lviv (UA); Roman Ogirko, Lviv (UA); Oleksandr Pirogov, Lviv (UA); Andriy Ryshtun, Lviv (UA); Darrin Vallis, San Jose, CA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 13/213,895

(22) Filed: Aug. 19, 2011

(65) Prior Publication Data

US 2012/0105361 A1 May 3, 2012

Related U.S. Application Data

(60) Provisional application No. 61/407,522, filed on Oct. 28, 2010, provisional application No. 61/407,903, (Continued)

(51) Int. Cl.
*G06F 3/044* (2006.01)
*G06F 3/0354* (2013.01)
(Continued)

(52) U.S. Cl.
CPC .......... *G06F 3/044* (2013.01); *G06F 3/03545* (2013.01); *G06F 3/046* (2013.01); *G06F 3/0416* (2013.01); *G06F 2203/04104* (2013.01)

(58) Field of Classification Search
CPC .... G06F 3/03545; G06F 3/0416; G06F 3/044; G06F 2203/04104; G06F 3/046
(Continued)

(56) References Cited

U.S. PATENT DOCUMENTS 4,273,958 A    6/1981   Hirata
5,149,919 A    9/1992   Greanias et al.
(Continued)

FOREIGN PATENT DOCUMENTS

CN    1679078 A    10/2005
CN    101714037 A    5/2010
(Continued)

OTHER PUBLICATIONS

Written Opinion of the International Searching Authority dated Feb. 17, 2012 for International Application No. PCT/US2011/045661; Entire Document.
(Continued)

*Primary Examiner* — Priyank Shah
(74) *Attorney, Agent, or Firm* — Morgan, Lewis & Bockius LLP

(57) ABSTRACT

A system comprising a sensing device and a capacitive sense array configured to detect a presence of a passive touch object and a stylus where the capacitive sense array receives a transmit signal from the stylus via capacitive coupling. The system further comprising a processing device configured to determine the stylus location on the capacitive sense array based on the transmit signal and to synchronize the stylus to the capacitive sense array. A system further comprises a demodulation block to extract additional data that is modulated into the transmit signal by the stylus. The demodulation block is configured to extract the additional data by amplitude shift keying. The additional data comprises at least one of an applied force value of the stylus tip, a button status data, a battery status data, or a stylus acceleration data.

20 Claims, 21 Drawing Sheets

Related U.S. Application Data filed on Oct. 28, 2010, provisional application No. 61/407,905, filed on Oct. 28, 2010, provisional application No. 61/407,906, filed on Oct. 28, 2010, provisional application No. 61/407,907, filed on Oct. 28, 2010.

(51) Int. Cl.
  *G06F 3/041* (2006.01)
  *G06F 3/046* (2006.01)

(58) Field of Classification Search
  USPC ........... 345/179, 156, 173; 178/18.01, 18.06, 178/19.01, 19.03, 19.04, 19.07
  See application file for complete search history.

(56) References Cited

U.S. PATENT DOCUMENTS

| | | |
|---|---|---|
| 5,247,138 A | 9/1993 | Landmeier |
| 5,469,193 A | 11/1995 | Giobbi |
| 5,729,251 A | 3/1998 | Nakashima |
| 5,736,980 A | 4/1998 | Iguchi |
| 6,002,387 A | 12/1999 | Ronkka et al. |
| 6,009,317 A | 12/1999 | Wynn |
| 6,081,261 A * | 6/2000 | Wolff et al. .................... 345/179 |
| 6,198,360 B1 | 3/2001 | Henrion |
| 6,441,810 B1 | 8/2002 | Skoog et al. |
| 6,641,533 B2 | 11/2003 | Causey et al. |
| 6,690,156 B1 * | 2/2004 | Weiner ...................... G01S 5/02 273/237 |
| 6,822,639 B1 | 11/2004 | Silverbrook |
| 7,245,293 B2 | 7/2007 | Hoshino et al. |
| 7,292,229 B2 | 11/2007 | Morag |
| 7,406,393 B2 | 7/2008 | Ely et al. |
| 7,986,716 B2 | 7/2011 | Veeramachaneni et al. |
| 8,036,465 B2 | 10/2011 | Khomo |
| 8,481,872 B2 | 7/2013 | Zachut |
| 8,797,301 B2 | 8/2014 | Ryshtun et al. |
| 2004/0095333 A1 * | 5/2004 | Morag ................ G06F 3/03545 345/173 |
| 2005/0162411 A1 | 7/2005 | Berkel van |
| 2006/0012581 A1 | 1/2006 | Haim et al. |
| 2007/0001950 A1 | 1/2007 | Zhang et al. |
| 2007/0157193 A1 | 7/2007 | Lowe et al. |
| 2007/0171211 A1 * | 7/2007 | Perski ...................... G06F 3/041 345/173 |
| 2007/0177533 A1 | 8/2007 | Palay et al. |
| 2008/0001078 A1 | 1/2008 | Pittel et al. |
| 2008/0001925 A1 | 1/2008 | Xiaoping |
| 2008/0055279 A1 | 3/2008 | Osada et al. |
| 2008/0150917 A1 | 6/2008 | Libbey et al. |
| 2008/0156546 A1 | 7/2008 | Hauck |
| 2008/0158165 A1 | 7/2008 | Geaghan et al. |
| 2009/0127003 A1 | 5/2009 | Geaghan |
| 2009/0314552 A1 | 12/2009 | Underwood et al. |
| 2010/0006350 A1 * | 1/2010 | Elias ...................... G06F 3/044 178/18.06 |
| 2010/0066693 A1 * | 3/2010 | Sato et al. .................... 345/173 |
| 2010/0085325 A1 | 4/2010 | King-Smith |
| 2010/0155153 A1 * | 6/2010 | Zachut ................. 178/18.03 |
| 2010/0170726 A1 * | 7/2010 | Yeh et al. ................ 178/19.03 |
| 2010/0181180 A1 | 7/2010 | Peter |
| 2010/0206644 A1 | 8/2010 | Yeh |
| 2010/0252335 A1 | 10/2010 | Orsley |
| 2010/0274131 A1 | 10/2010 | Barnes et al. |
| 2011/0122087 A1 | 5/2011 | Jang et al. |
| 2011/0293171 A1 | 12/2011 | Vold et al. |
| 2012/0050207 A1 | 3/2012 | Westhues et al. |
| 2012/0062498 A1 * | 3/2012 | Weaver ............... G06F 3/03545 345/174 |
| 2012/0062499 A1 | 3/2012 | Weaver et al. |
| 2013/0207938 A1 | 8/2013 | Ryshtun et al. |
| 2013/0207939 A1 | 8/2013 | Kremin et al. |

FOREIGN PATENT DOCUMENTS

| | | |
|---|---|---|
| GB | 2393838 A | 4/2004 |
| JP | 8234902 A | 9/1996 |
| JP | 2002297300 A | 10/2002 |
| JP | 2003263274 A | 9/2003 |

OTHER PUBLICATIONS

International Search Report of the International Searching Authority dated Feb. 17, 2012 for International Application No. PCT/US2011/045661; Entire Document.

Cypress Semiconductor Corporation, International Search Report, PCTUS2011/045675, Fe. 17, 2012, 8 pgs.

Cypress Semiconductor Corporation, International Search Report and Written Opinion, PCTUS2011/045687, Feb. 17, 2012, 9 pgs.

Cypress Semiconductor Corporation, International Search Report and Written Opinion, PCTUS2012/047308, Aug. 17, 2012, 5 pgs.

Green, "Quadrature Receiver Mismatch Calibration," dated Nov. 1999, 4 pgs.

Hill et al., "Smart Sensor Instrumentation Development Example Including the New Paradigm of an FPGA Based System," Dated 2007, 13 pgs.

Kremin, Office Action, U.S. Appl. No. 13/213,981, Oct. 2, 2012, 14 pgs.

Kremin, Final Office Action, U.S. Appl. No. 13/213,981, Mar. 14, 2013, 16 pgs.

Kremin, Office Action, U.S. Appl. No. 13/213,981, Sep. 12, 2013, 18 pgs.

Kremin, Final Office Action, U.S. Appl. No. 13/213,981, Nov. 25, 2013, 18 pgs.

Kremin, Office Action, U.S. Appl. No. 13/213,981, Feb. 27, 2014, 19 pgs.

Kremin, Final Office Action, U.S. Appl. No. 13/213,981, May 2, 2014, 20 pgs.

Kremin, Office Action, U.S. Appl. No. 13/213,981, Jul. 31, 2014, 20 pgs.

Kremin, Final Office Action, U.S. Appl. No. 13/213,981, Oct. 8, 2014, 22 pgs.

Kremin, Office Action, U.S. Appl. No. 13/214,048, Feb. 15, 2013, 14 pgs.

Kremin, Notice of Allowance, U.S. Appl. No. 13/214,048, May 29, 2013, 6 pgs.

Kremin, Office Action, U.S. Appl. No. 13/434,571, May 31, 2012, 18 pgs.

Kremin, Final Office Action, U.S. Appl. No. 13/434,571, Aug. 30, 2012, 17 pgs.

Kremin, Notice of Allowance, U.S. Appl. No. 13/434,571, Oct. 9, 2012, 5 pgs.

Wright, Office Action, U.S. Appl. No. 13/947,596, Jun. 10, 2014, 14 pgs.

Wright, Final Office Action, U.S. Appl. No. 13/947,596, Aug. 5, 2014, 16 pgs.

Wright, Office Action, U.S. Appl. No. 13/947,596, Mar. 4, 2015, 16 pgs.

Wright, Notice of Allowance, U.S. Appl. No. 13/947,596, May 4, 2015, 5 pgs.

Wright, Notice of Allowance, U.S. Appl. No. 13/947,596, Sep. 23, 2015, 5 pgs.

Cypress Semiconductor Corporation, International Search Report and Written Opinion, PCTUS2012/052920, Dec. 7, 2012, 5 pgs.

Cypress Semiconductor Corporation 2nd Office Action, CN201180002763.4, May 17, 2016, 19 pgs.

Cypress Semiconductor Corporation, Office Action, CN201180002768.7, Apr. 5, 2016, 9 pgs.

Cypress Semiconductor Corporation, Second Office Action, CN201180002768.7, Aug. 3, 2016, 9 pgs.

Hofer amd Kunz, Mighty Trace: Multiuser Tracking Technology, kated Apr. 5, 2008, 4 pgs.

Ryshtun, Office Action, U.S. Appl. No. 13/421,873, Mar. 3, 2014, 13 pgs.

(56) References Cited

OTHER PUBLICATIONS

Ryshtun, Notice of Allowance, U.S. Appl. No. 13/421,873, May 29, 2014, 8 pgs.
Ryshtun, Notice of Allowance, U.S. Appl. No. 13/421,873, Jun. 16, 2014, 5 pgs.
Ryshtun, Office Action, U.S. Appl. No. 14/332,727, May 18, 2016, 21 pgs.
Tsang, Handwriting tracking based on coupled, dated Dec. 15-18, 2007, 5 pgs.
Wahab, Wireless pointing device using coupling, Dec. 1997, 4 pgs.
Wright, Office-Action, U.S. Appl. No. 13/214,048, Feb. 15, 2013, 14 pgs.
Wright Notice-of-Allowance, U.S. Appl. No. 13/214,048, May 29, 2013, 6 pgs.
Wright, Notice of Allowance, U.S. Appl. No. 13/947,596, Apr. 6, 2016, 5 pgs.
Cypress Semiconductor Corporation, 1st Office Action, CN201180002763.4, Jul. 24, 2015, 15 pgs.
Parade, Notice of Allowance, CN201180002771.9, Nov. 7, 2016, 3 pgs.
Parade, Notice of Allowance, CN201180002768.7, Oct. 10, 2016, 3 pgs.
Ryshtun, Notice of Allowance, U.S. Appl. No. 14/332,727, filed Dec. 2, 2016, 8 pgs.

* cited by examiner

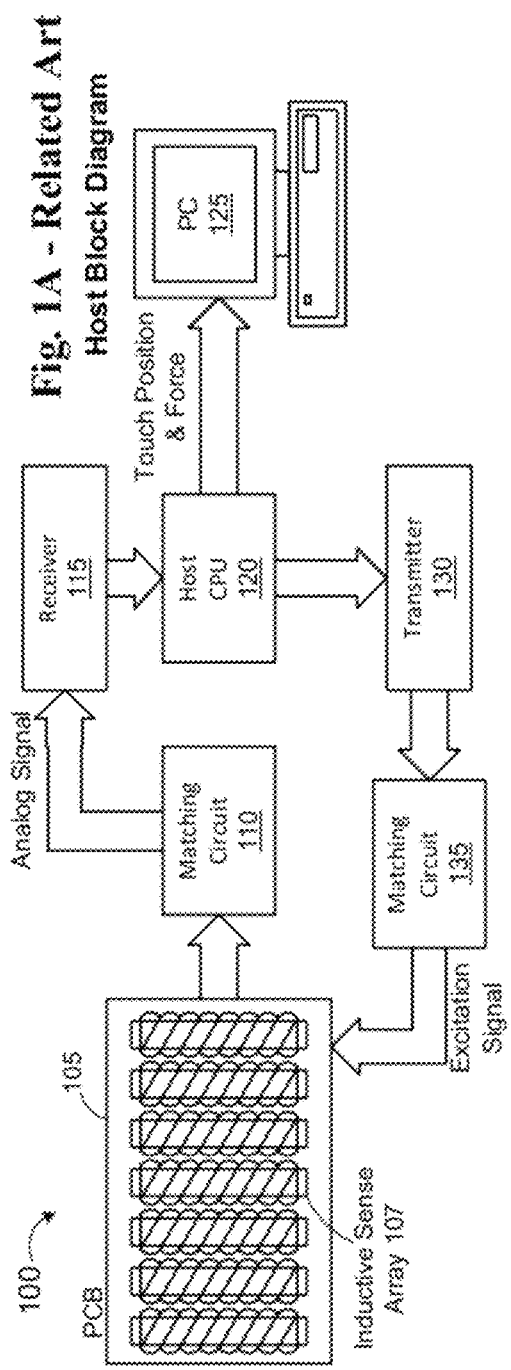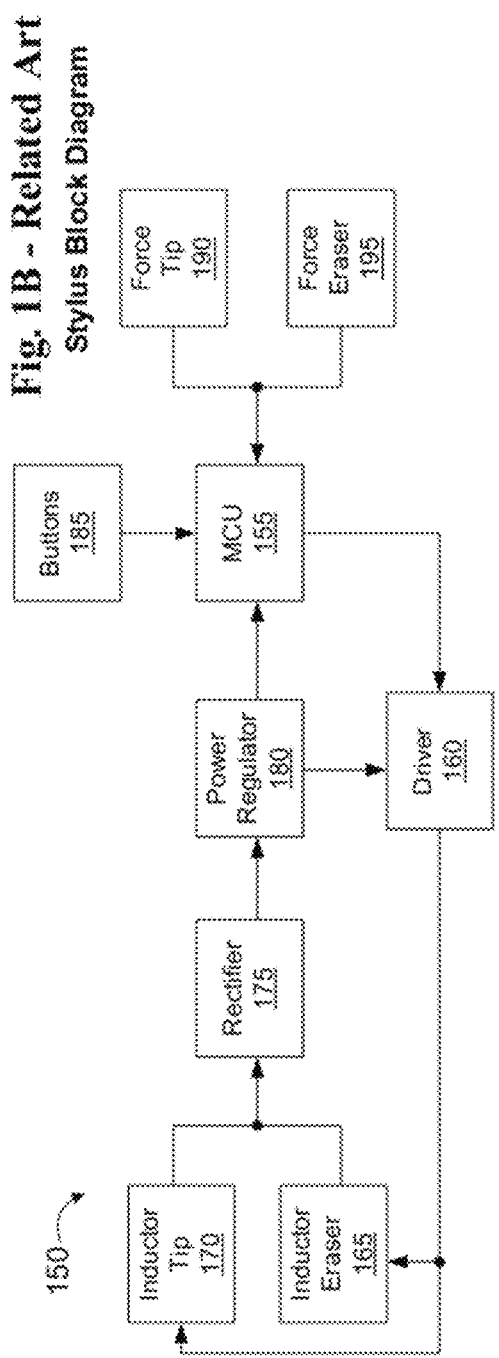

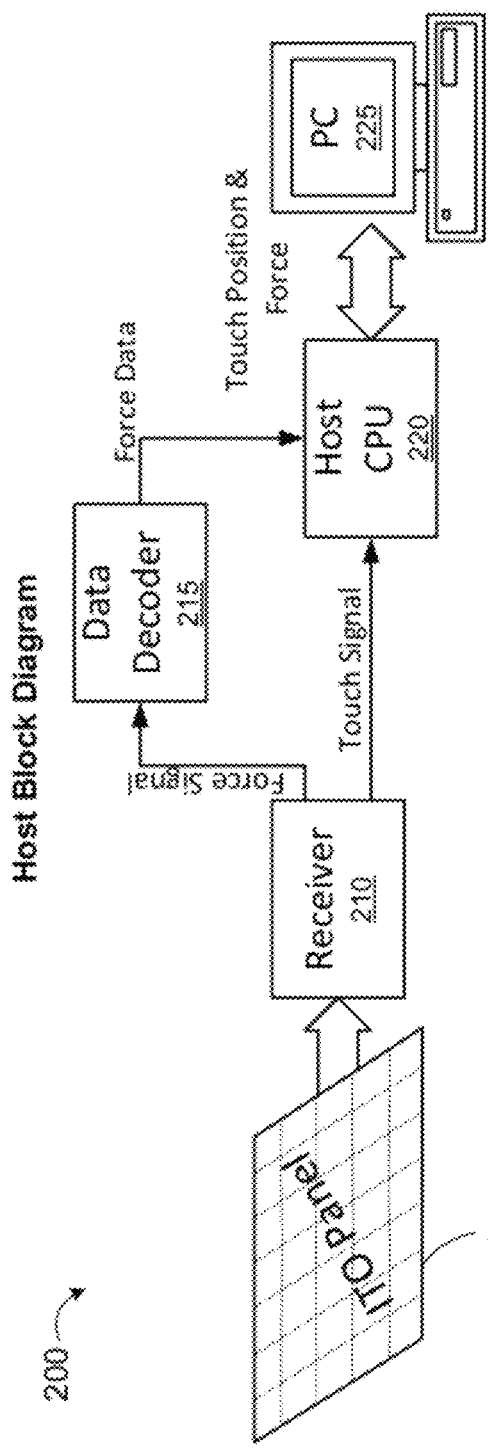
Fig. 2A - Related Art
Fig. 2B - Related Art

Magnetic Transmitter Antenna

Magnetic Coil Around The Screen

Magnetic + Electric Transmitter Antenna

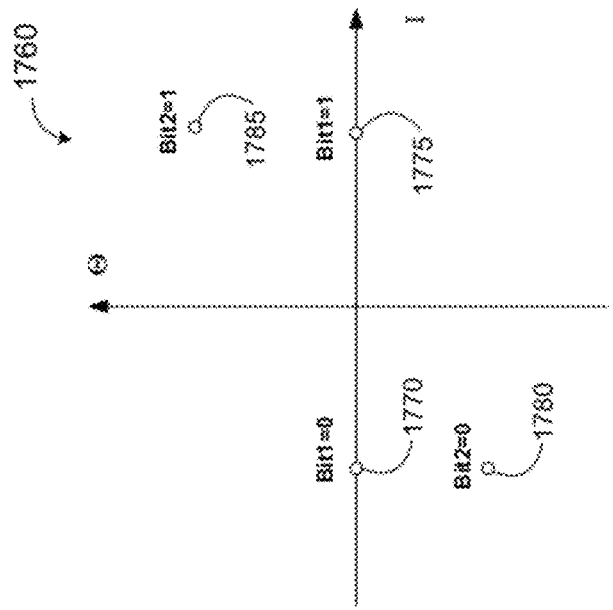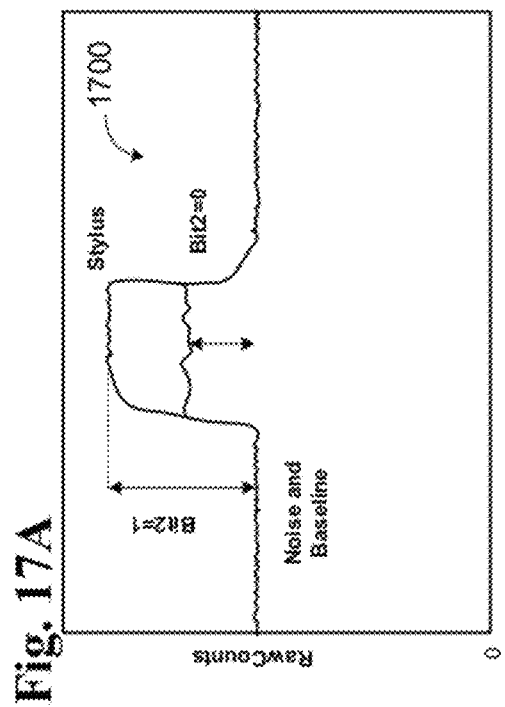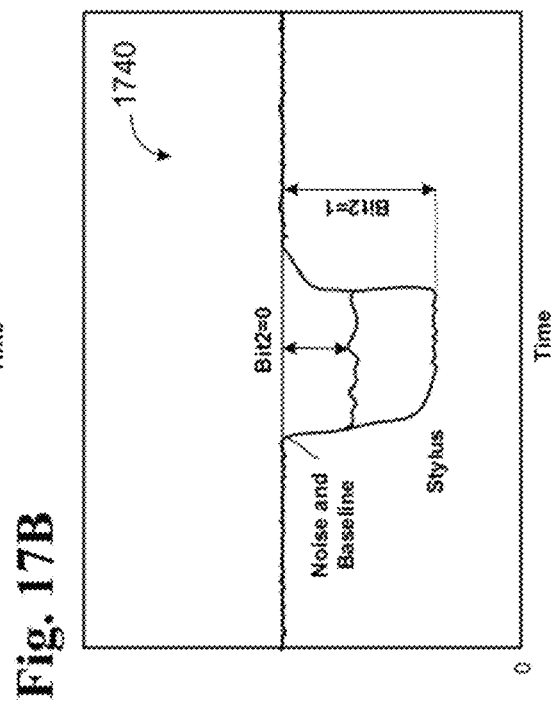

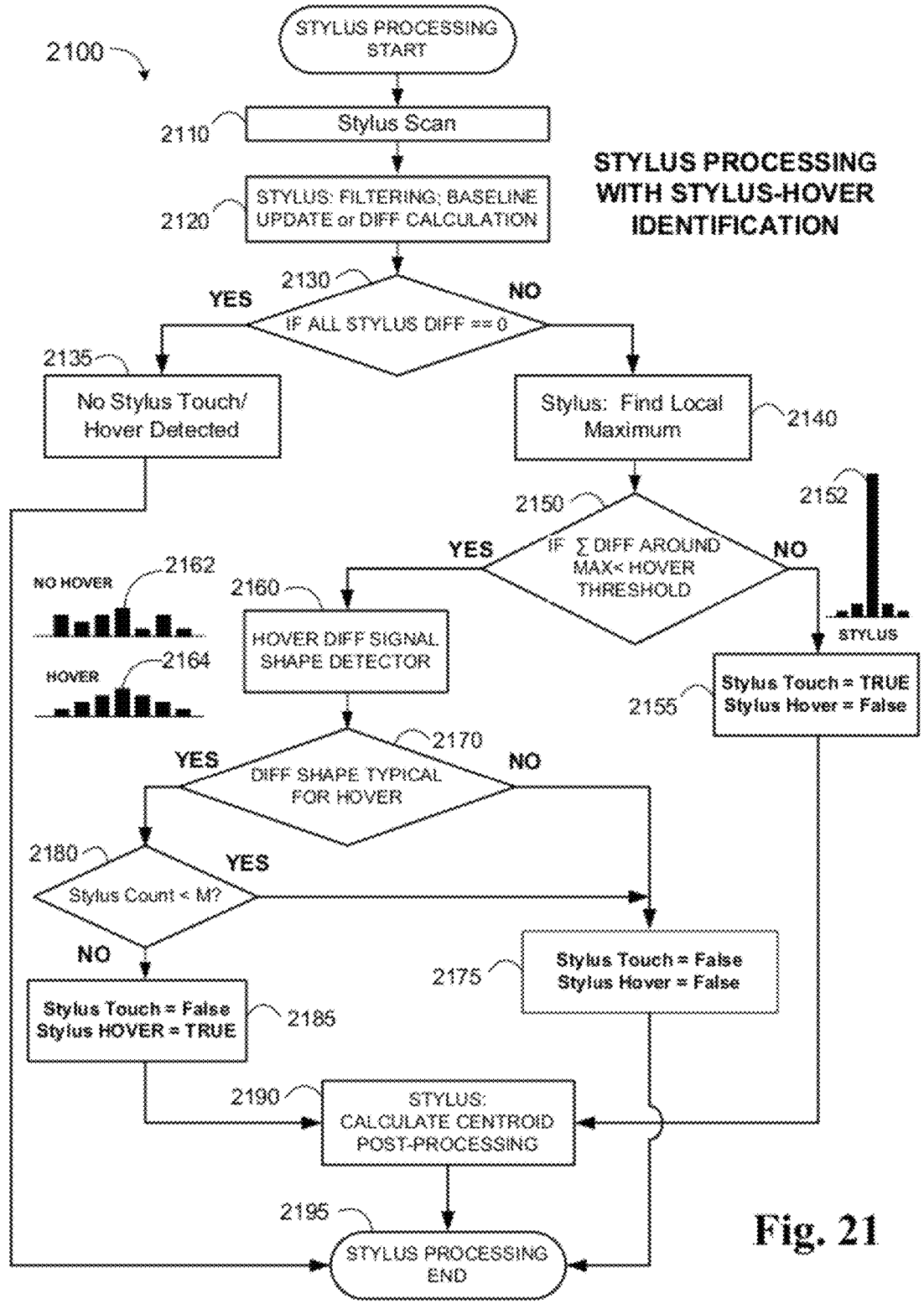

CAPACITIVE SENSE ARRAY FOR DETECTING PASSIVE TOUCH OBJECTS AND AN ACTIVE STYLUS

RELATED APPLICATION

This application claims the benefit of U.S. Provisional Application No. 61/407,522, filed Oct. 28, 2010, U.S. Provisional Application No. 61/407,903, filed Oct. 28, 2010, U.S. Provisional Application No. 61/407,905, filed Oct. 28, 2010, U.S. Provisional Application No. 61/407,906, filed Oct. 28, 2010, and U.S. Provisional Application No. 61/407,907, filed Oct. 28, 2010, the contents of all are hereby incorporated by reference. This application is related to co-pending U.S. application No. 13/213,981, entitled "Synchronizing a Stylus with a Capacitive Sense Array," filed herewith, the contents of which are hereby incorporated by reference. This application is related to U.S. application No. 13/214,048 (now U.S. Pat. No. 8,493,359), entitled "Capacitive Stylus for a Touch Screen."

TECHNICAL FIELD

This disclosure relates to the field of user interface devices and, in particular, to capacitive sensor devices.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. The original PalmPilots® devices from the mid-1990s were one of the first successful commercial devices to utilize a resistive touch screen designed for use with a stylus and helped to popularize that technology. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered active stylus approaches have been implemented for use with touch screens and are found in many consumer applications such as point-of-sale terminals (e.g., the signature pad used for credit card transactions in retail stores) and other public uses. However, the need for a tethered cable is a significant drawback for private applications such as personal computers ("PCs"), smart phones, and tablet PCs.

FIG. 1A is a block diagram illustrating a conventional embodiment of a host device 100 for tracking the position of a touch object on an inductive sense array 107. The host device 100 includes a printed circuit board ("PCB") 105, a first matching circuit 110, a receiver 115, a host central processing unit ("CPU") 120, a personal computer ("PC") 125, a transmitter 130, and a second matching circuit 135. The PCB 105 is typically placed behind a touch screen (not shown) and includes an inductive sense array 107. The inductive sense array 107 includes a series of inductive coils. Inductive sense arrays are typically heavy and expensive to manufacture.

FIG. 1B is a block diagram illustrating a conventional embodiment of an active stylus 150 used in a system for tracking the position of a touch object on an inductive sense array 107. The stylus 150 includes a micro-controller unit ("MCU") 155, a driver 160, and inductor eraser 165, and inductor tip 170, a rectifier 175, a power regulator 180, a button(s) 185, a force tip 190, and a force eraser 195. The inductor eraser 165 and inductor tip 170 are configured on different stylus edges.

In operation, the inductive sense array 107 on PCB 105 generates a magnetic field to provide both stylus power generation and touch position detection. Regarding touch position, the matching circuit 110 provides impedance matching and couples the stylus 150 signal from the inductive sense array 107 to the receiver 115. The receiver 115 and host CPU 120 receives and process the analog signal, respectively, providing touch position and force data to the PC 125. Force data is indicative of the amount of pressure provided by the stylus tip to the touch screen. The host CPU 120 calculates the touch position based on the relative inductor signal strength of each coil of the inductive sense array 107. More specifically, the presence of the stylus 150 changes the individual inductor currents for each coil in the inductive sense array 107 based on their relative proximity to the stylus. The maximum signal strength approximates the stylus 150 touch position on the accompanying touch screen.

The host CPU 120 sends a high frequency carrier signal to the stylus 150 via an amplifier (not shown), a transmitter 130, an impedance matching circuit 135, and the inductive sense array 107. The stylus 150 receives and utilizes the high frequency carrier signal for self-powering and data transmission. In operation, the stylus 150 rectifies (rectifier 175) and regulates (power regulator 180) the carrier signal and feeds the resultant signal to the MCU 155 and driver 160. The MCU 155 measures force sensors (force tip 190 and force eraser 195) and button states (button(s) 185) and couples the resultant data signal to the driver 160. The driver 160 drives the inductor tip 170 and inductor eraser 165, which inductively couples the stylus 150 to the inductive sense array 107.

Stylus 150 sensing is implemented largely independent of the finger-sensing capability of the touch screen. As described above, stylus tracking requires generating an alternative current (AC) signal by the inductive sense array 107 and inductively coupling the AC signal to the tip of the stylus 150. The inductive sense array 107, located behind the touch screen, in turn receives the stylus signal and the Host CPU 120 interpolates the position of the stylus tip (inductor tip 170) based on the relative magnitude of the received stylus signals at each of the inductive sensors of the inductive sense array 107. While inductive sensing may be reliable, inductive stylus tracking solutions exhibit serious commercial disadvantages including high power consumption, high electromagnetic interference ("EMI"), high manufacturing costs, and heavy construction. Furthermore, retro fitting an existing touch sensor (passive touch object sensor) to include independent stylus tracking would require an additional PCB 105 layer to incorporate the inductive sense array 107.

FIG. 2A is a block diagram illustrating a conventional embodiment of a host device 200 for tracking the position of a touch object on a radio frequency ("RF") sense array. The host device 200 includes an Indium-Tin-Oxide ("ITO") panel 205, a receiver 210, a data decoder 215, a host CPU 220, and a PC 225. In FIG. 2B, the stylus 250 includes a force sensor 255, a measurer 260, a modulator 265, an amplifier 270, a stylus tip 275, and a reference clock 280. The stylus 250 is typically battery powered (not illustrated).

In operation, the stylus 250 generates, amplifies, and couples an RF carrier signal from the stylus tip 275 to the ITO panel 205 via RF coupling. The ITO panel 205 functions as an antenna and receives the RF carrier signal from the stylus 250 as described below with respect to FIG. 2B. The selective receiver 210 demodulates the RF carrier signal and couples a touch position signal to the host CPU 220 and a force data signal to the data decoder 215. The data decoder 215 extracts the force data and couples it to the host CPU 220. The host CPU 220 calculates the stylus touch position based on the relative maximum amplitude of the RF signal detected on the ITO lines of ITO panel 205. The host CPU 220 further determines the force applied to the stylus based on the force data. The host CPU 220 is controlled by the PC 225.

FIG. 2B is a block diagram illustrating a conventional embodiment of an active stylus used in a system for tracking the position of a touch object on an RF sense array. The measurer 260 of stylus 250 measures the force induced on the force sensor 255 and the modulator 265 modulates the resultant force data with a carrier frequency, provided by the reference clock 280. The amplifier 270 amplifies the modulated signal and transmits the modulated carrier frequency from the stylus tip 275. As described above, the host 200 decodes the modulated carrier signal and transmits the result to the PC 225. While an RF sense array solution may offer cost savings and a reduced component count, they require special narrow band receivers on the host 200 and are subject to RF noise and interference. Consequently, conventional touch panel solutions may have significant disadvantages in cost, performance, applicability, and reliability.

BRIEF DESCRIPTION OF THE DRAWINGS

The present invention is illustrated by way of example, and not of limitation, in the figures of the accompanying drawings in which:

FIG. 1A is a block diagram illustrating a conventional embodiment of a host device for tracking the position of a touch object on an inductive sense array.

FIG. 1B is a block diagram illustrating a conventional embodiment of an active stylus used in a system for tracking the position of a stylus on an inductive sense array.

FIG. 2A is a block diagram illustrating a conventional embodiment of a host device for tracking the position of a stylus on a radio frequency sense array.

FIG. 2B is a block diagram illustrating a conventional embodiment of an active stylus used in a system for tracking the position of a stylus on a radio frequency sense array.

FIG. 17A is a waveform illustrating a stylus TX signal utilizing a two-bit, quadrature phase shift keyed ("QPSK") modulation scheme, according to an embodiment of the invention.

FIG. 17B is a waveform illustrating a stylus TX signal utilizing a two-bit quadrature phase shift keyed ("QPSK") modulation scheme, according to an embodiment of the invention.

FIG. 17C is a graph illustrating polar coordinates and phase relationships for a two-bit QPSK modulation scheme, according to an embodiment of the invention.

FIG. 21 is flow diagram of one embodiment of a method of tracking the position of a stylus that is contacting or hovering over a capacitive sense array.

DETAILED DESCRIPTION

Apparatuses and methods of synchronizing a stylus to a capacitive sense array are described. In one embodiment, a touch screen controller wirelessly transmits a synchronization signal to the stylus to synchronize the stylus and the capacitive sense array. In an embodiment, the stylus capacitively couples the TX signal to the capacitive sense array. In one embodiment, the stylus is configured to modulate additional data into the stylus TX signal, including, but not limited to, stylus tip force data, stylus button data, stylus acceleration, and stylus battery data. In an embodiment, the touch screen controller is configured to transmit a TX signal on the row electrodes of the capacitive sense array, and receive the resulting RX signal on the column electrodes of the capacitive sense array to track the position of a passive touch object on the capacitive sense array. In another embodiment, the touch screen controller is configured to receive the stylus TX signal from the stylus on both the rows and columns of electrodes to track the position of the stylus on the capacitive sense array. It should be noted that the touch screen controller may utilize the row and column electrodes interchangeably to transmit and receive the TX & RX signals for locating and tracking the position of a passive touch object.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 3:
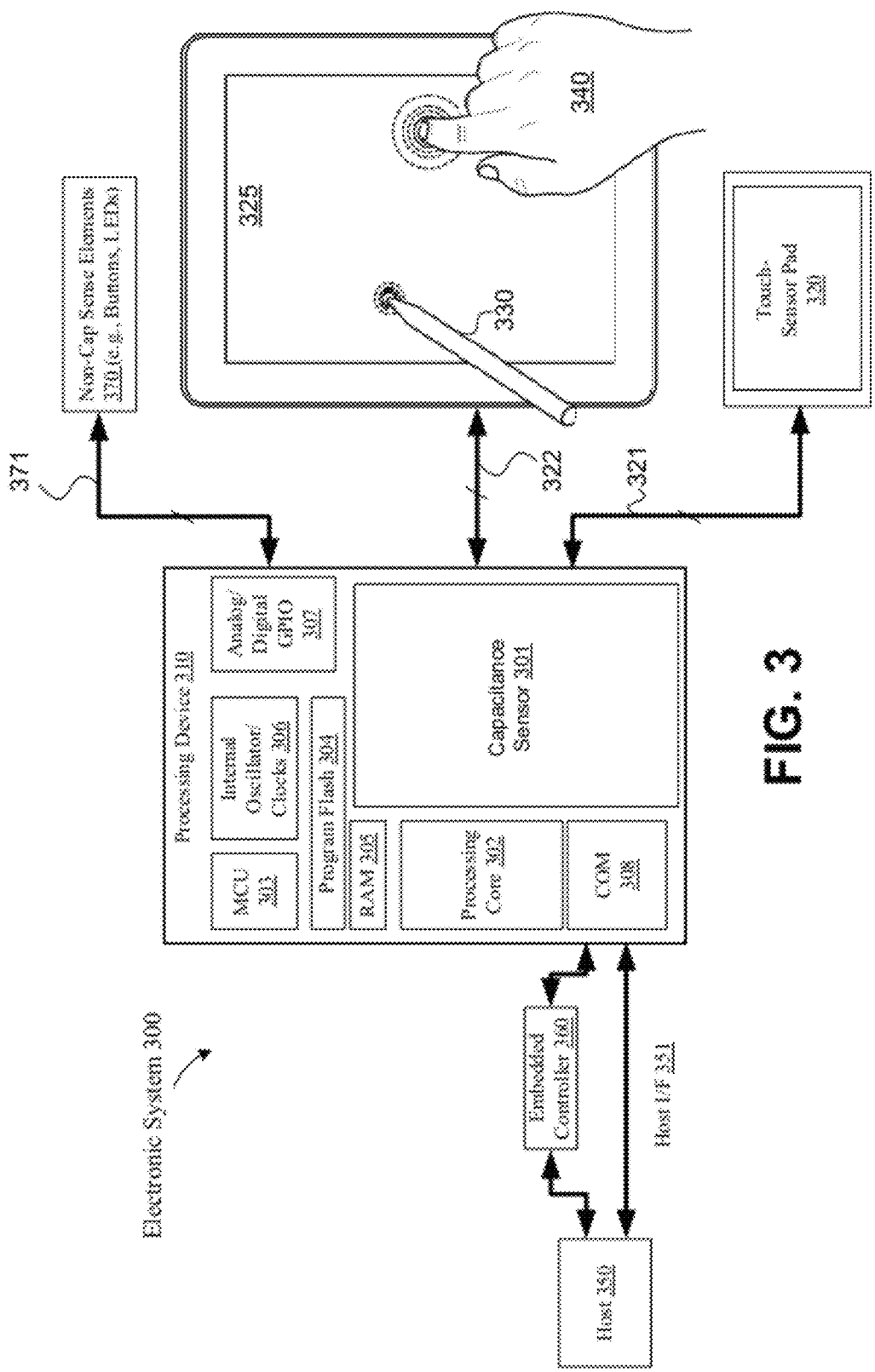
FIG. 3 is a block diagram illustrating one embodiment of an electronic system having a processing device for detecting a presence of a touch object and a stylus.

FIG. 3 is a block diagram illustrating one embodiment of an electronic system 300 having a processing device 310 for detecting a presence of a touch object 340 and a stylus 330. Electronic system 300 includes processing device 310, touch screen 325, touch sensor pad 320, stylus 330, host processor 350, embedded controller 360, and non-capacitance sense elements 370. In the depicted embodiment, the electronic system 300 includes the touch screen 325 coupled to the processing device 310 via bus 322. Touch screen 325 may include a multi-dimension capacitive sense array. The multi-dimension sense array includes multiple sense elements, organized as rows and columns. In another embodiment, the touch screen 325 operates as an all-points-addressable ("APA") mutual capacitance sense array, as described with respect to FIG. 4. In another embodiment, the touch screen 325 operates as a coupled-charge receiver, as described with respect to FIG. 4.

The operations and configurations of the processing device 310 and the touch screen 325 for detecting and tracking the touch object 340 and stylus 330 are described in detail below with respect to FIGS. 4-6B. In short, the processing device 310 is configured to detect a presence of the stylus 330 on the touch screen 325, as well as a presence of the touch object 340. The processing device 310 may detect and track the stylus 330 and the touch object 340 individually on the touch screen 325. In one embodiment, the processing device 310 can detect and track both the stylus 330 and touch object 340 concurrently on the touch screen 325. In one embodiment, the stylus 330 is configured to operate as the timing "master," and the processing device 310 adjusts the timing of the touch screen 325 to match that of the stylus 330 when the stylus 330 is in use. As described herein, the touch screen 325 capacitively couples with the stylus 330, as opposed to conventional inductive stylus applications. It should also be noted that the same assembly used for the touch screen 325, which is configured to detect touch objects 340, is also used to detect and track the stylus 330 without an additional PCB layer for inductively tracking the stylus 330 as done conventionally.

In the depicted embodiment, the processing device 310 includes analog and/or digital general purpose input/output ("GPIO") ports 307. GPIO ports 307 may be programmable. GPIO ports 307 may be coupled to a Programmable Interconnect and Logic ("PIL"), which acts as an interconnect between GPIO ports 307 and a digital block array of the processing device 310 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 310 may also include memory, such as random access memory ("RAM") 305 and program flash 304. RAM 305 may be static RAM ("SRAM"), and program flash 304 may be a non-volatile storage, which may be used to store firmware (e.g., control algorithms executable by processing core 302 to implement operations described herein). Processing device 310 may also include a memory controller unit ("MCU") 303 coupled to memory and the processing core 302.

The processing device 310 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO 307.

As illustrated, capacitance sensor 301 may be integrated into processing device 310. Capacitance sensor 301 may include analog I/O for coupling to an external component, such as touch-sensor pad 320, touch screen 325, touch-sensor slider (not shown), touch-sensor buttons (not shown), and/or other devices. Capacitance sensor 301 and processing device 310 are described in more detail below.

In one embodiment, the electronic system 300 includes a touch sensor pad 320 coupled to the processing device 310 via bus 321. Touch sensor pad 320 may include a multi-dimension capacitive sense array. The multi-dimension sense array includes multiple sense elements, organized as rows and columns. In another embodiment, the touch sensor pad 320 is an APA mutual capacitance sense array, as described with respect to FIG. 4. In another embodiment, the touch sensor pad 320 operates as a coupled-charge receiver, as described with respect to FIG. 4.

In an embodiment, the electronic system 300 may also include non-capacitance sense elements 370 coupled to the processing device 310 via bus 371 and GPIO port 307. The non-capacitance sense elements 370 may include buttons, light emitting diodes ("LEDs"), and other user interface devices, such as a mouse, a keyboard, or other functional keys that do not require capacitance sensing. In one embodiment, buses 321, 322, and 371 are embodied in a single bus. Alternatively, these buses may be configured into any combination of one or more separate buses.

Processing device 310 may include internal oscillator/clocks 306 and communication block ("COM") 308. In another embodiment, the processing device 310 includes a spread spectrum clock (not shown). The oscillator/clocks block 306 provides clock signals to one or more of the components of processing device 310. Communication block 308 may be used to communicate with an external component, such as a host processor 350, via host interface ("I/F") line 351. Alternatively, processing block 310 may also be coupled to embedded controller 360 to communicate with the external components, such as host 350. In one embodiment, the processing device 310 is configured to communicate with the embedded controller 360 or the host 350 to send and/or receive data.

Processing device 310 may reside on a common carrier substrate such as, for example, an integrated circuit ("IC") die substrate, a multi-chip module substrate, or the like. Alternatively, the components of processing device 310 may be one or more separate integrated circuits and/or discrete components. In one exemplary embodiment, processing device 310 is the Programmable System on a Chip (PSoC®) processing device, developed by Cypress Semiconductor Corporation, San Jose, Calif. Alternatively, processing device 310 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 310 may also be done in the host.

Capacitance sensor 301 may be integrated into the IC of the processing device 310, or alternatively, in a separate IC. Alternatively, descriptions of capacitance sensor 301 may be generated and compiled for incorporation into other integrated circuits. For example, behavioral level code describing capacitance sensor 301, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 301.

It should be noted that the components of electronic system 300 may include all the components described above. Alternatively, electronic system 300 may include only some of the components described above.

In one embodiment, the electronic system 300 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 4:
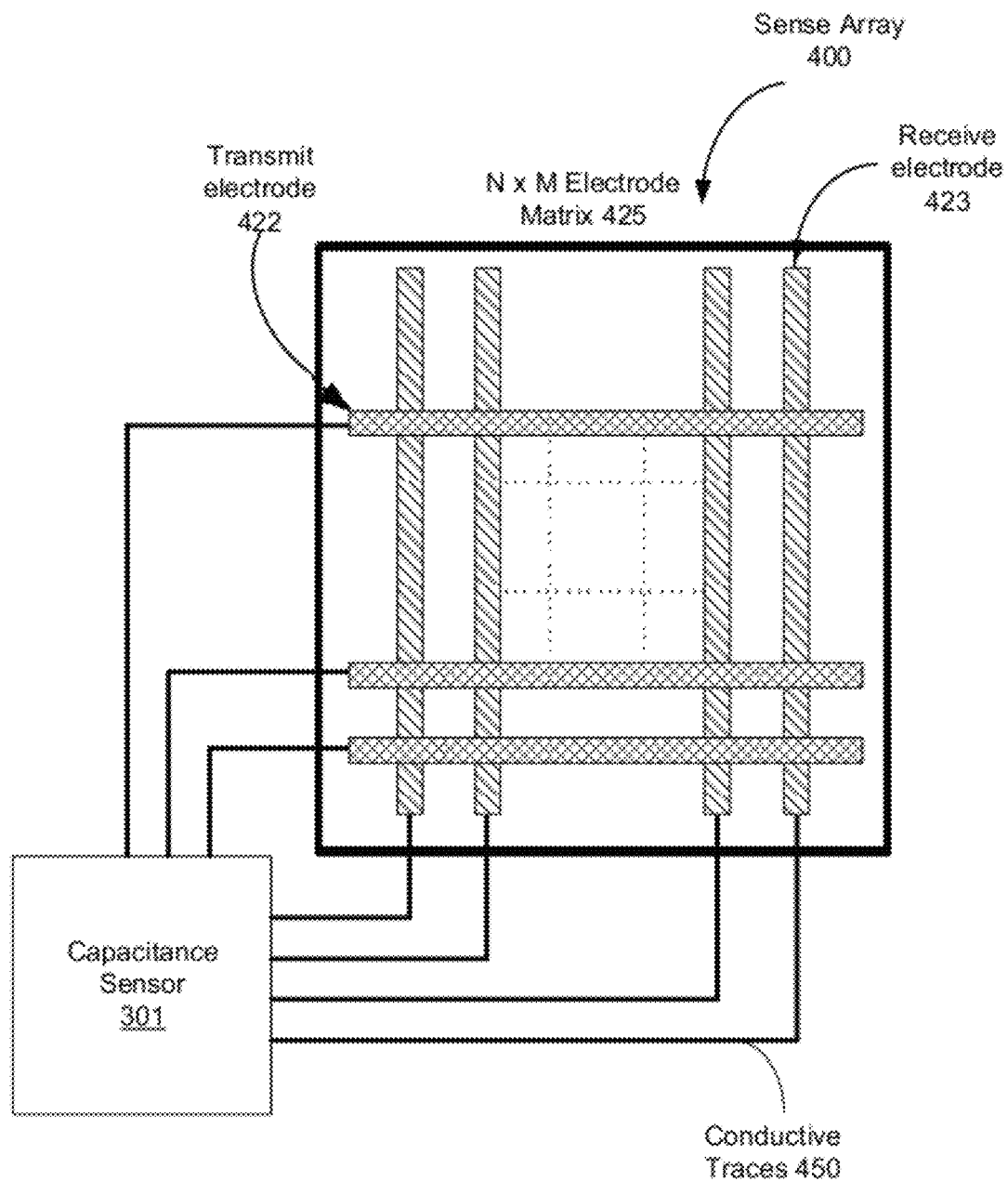
FIG. 4 is a block diagram illustrating one embodiment of a capacitance sense array including an N×M electrode matrix and a capacitance sensor that converts measured capacitances to touch coordinates.

FIG. 4 is a block diagram illustrating one embodiment of a capacitive sense array 400 including an N×M electrode matrix 425 and the capacitance sensor 301 that converts measured capacitances to touch coordinates. The capacitive sense array 400 may be, for example, the touch screen 325 or the touch sensor pad 320 of FIG. 3. The N×M electrode matrix 425 includes N×M electrodes (N receive electrodes and M transmit electrodes), which further includes transmit ("TX") electrode 422 and receive ("RX") electrode 423. Each of the electrodes in N×M electrode matrix 425 is connected to the capacitance sensor 301 by one of the conductive traces 450. In one embodiment, capacitance sensor 301 operates using a charge accumulation circuit, a capacitance modulation circuit, or other capacitance sensing methods known by those skilled in the art. In an embodiment, the capacitance sensor 301 is of the Cypress TMA-3xx family of touch screen controllers. Alternatively, other capacitance sensors may be used. The mutual capacitance sense arrays, or touch screens, as described above, may include a transparent, conductive sense array disposed on, in, or under either a visual display itself (e.g. LCD monitor), or a transparent substrate in front of the display. In an embodiment, the TX and RX electrodes are configured in rows and columns, respectively. In should be noted that the rows and columns of electrodes can be configured as TX or RX electrodes by the capacitance sensor 301 in any chosen combination. In one embodiment, the TX and RX electrodes of the sense array 400 are configured to operate as a TX and RX electrodes of a mutual capacitance sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. The capacitance sensor 301 does not use mutual capacitance or self-capacitance sensing to measure capacitances of the sense elements when performing a stylus can. Rather, the capacitance sensor 301 measures a charge that is capacitively coupled between the sense array 400 and the stylus as described herein.

The TX and RX electrodes in the N×M electrode matrix 425 are arranged orthogonally so that each of the TX electrodes intersects and overlaps each of the RX electrodes. Thus, each TX electrode is capacitively coupled with each of the RX electrodes. For example, TX electrode 422 is capacitively coupled with RX electrode 423 at the point where TX electrode 422 and RX electrode 423 overlap. The intersections of TX and RX electrodes 422 and 423 each form a capacitive sense element.

Because of the capacitive coupling between the TX and RX electrodes, the application of a TX signal at each TX electrode induces a current at each of the RX electrodes. For instance, when a TX signal is applied to TX electrode 422, the TX signal induces an RX signal on the RX electrode 423 in N×M electrode matrix 425. The RX signal on each of the RX electrodes can then be measured in sequence by using a multiplexor to connect each of the N RX electrodes to a demodulation circuit in sequence. The capacitance associated with each intersection between a TX electrode and an RX electrode can be sensed by selecting every available combination of TX electrode and RX electrode.

When a touch object, such as a finger or stylus, approaches the N×M electrode matrix 425, the object causes a decrease in capacitance affecting only some of the electrodes. For example, if a finger is placed near the intersection of TX electrode 422 and RX electrode 423, the presence of the finger decreases the coupling capacitance between the two electrodes 422 and 423. In another embodiment, the presence of the finger increases the coupling capacitance between the two electrodes 422 and 423. Thus, the location of the finger on the touchpad can be determined by identifying both the RX electrode having a decreased coupling capacitance between the RX electrode and the TX electrode to which the TX signal was applied at the time the decreased capacitance was measured on the RX electrode. Therefore, by sequentially determining the capacitances associated with each intersection of electrodes in the N×M electrode matrix 425, the locations of one or more inputs can be determined. It should be noted that the process can calibrate the sense elements (intersections of RX and TX electrodes by determining baselines for each of the sense elements. It should also be noted that interpolation may be used to detect finger position at better resolutions than the row/column pitch as would be appreciated by one of ordinary skill in the art having the benefit of this disclosure. In addition, various types of centroid algorithms may be used to detect the center of the touch as would be appreciated by one of ordinary skill in the art having the benefit of this disclosure.

Figure 5A:
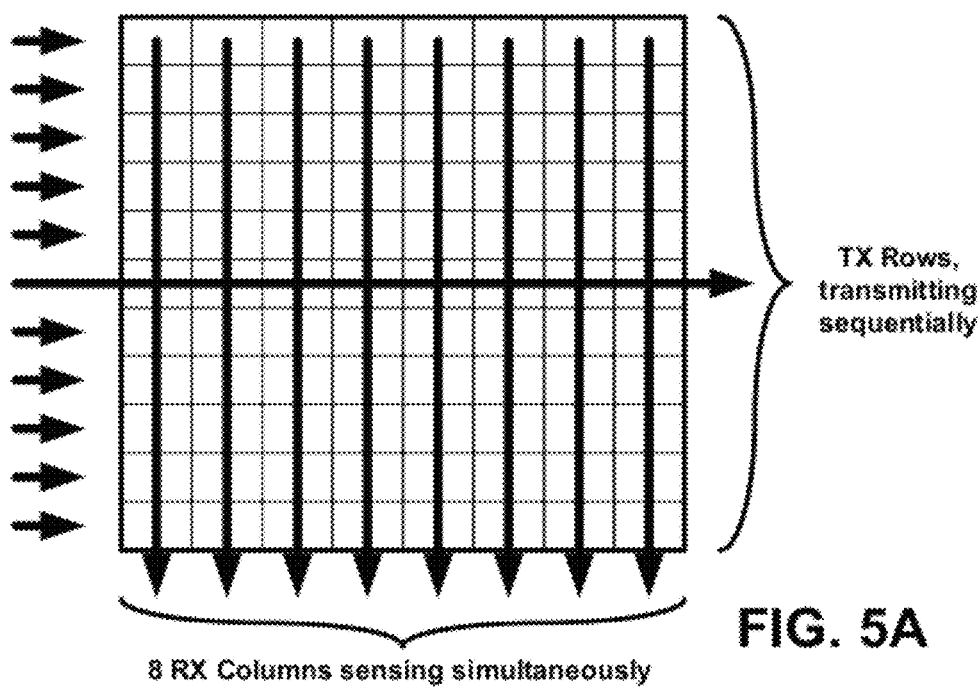
FIG. 5A is diagram illustrating one embodiment of a method of scanning an all-points-addressable mutual capacitance sense array.
Figure 5B:
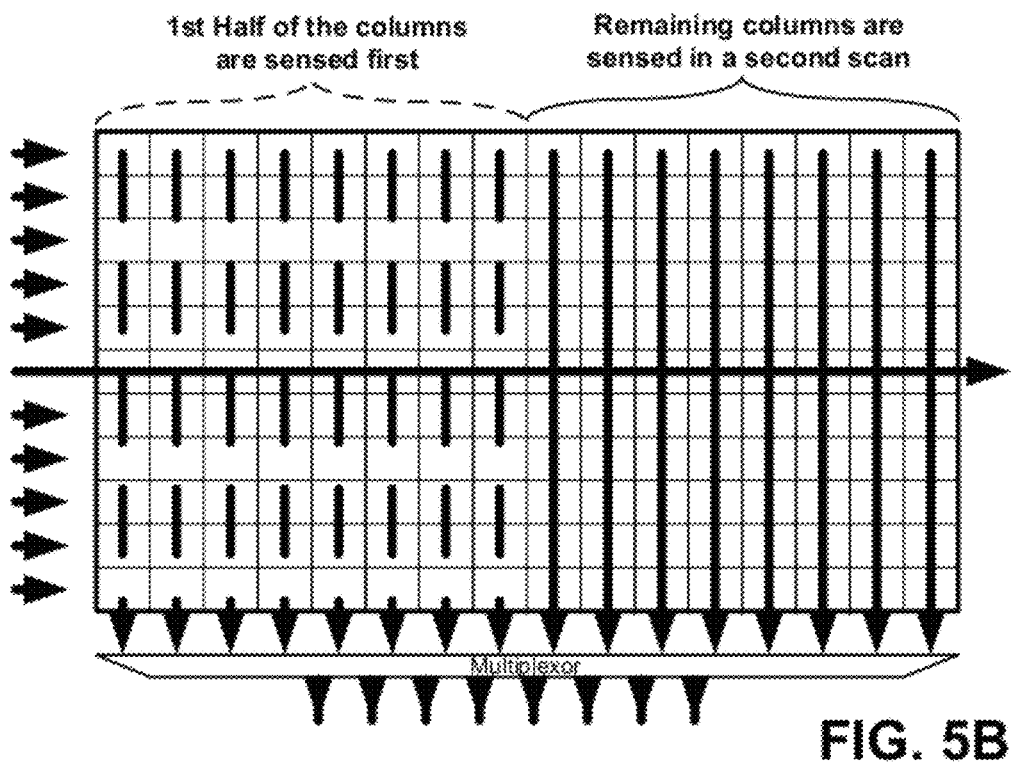
FIG. 5B is diagram illustrating one embodiment of a method of scanning an all-points-addressable mutual capacitance sense array.

In other words, sensing is achieved by applying a transmit signal to each row of TX electrodes in turn for a short period of time and during that period, sensing the amount of charge coupled from that row of TX electrodes to each of the columns of RX electrodes. In one embodiment, the charge coupled from TX electrodes to RX electrodes at each intersection is measured one row at a time, (as shown in FIG. 5A) until a map of charge measurements has been created for the entire screen. In other embodiments, each row may need to be driven twice and subsequently multiplexed if there are more columns than available sensing channels, as shown in FIG. 5B. Other variations of scanning patterns may be used as would be appreciated by one of ordinary skill in the art. Furthermore, the conversion of the induced current waveform to touch position coordinates indicating a position of an input on a touch sensor pad would be understood by those of ordinary skill in the art.

Although the TX and RX electrodes 422, 423, appear as bars or elongated rectangles in FIG. 4, alternative embodiments may use various tessellated shapes such as diamonds, rhomboids, chevrons, and other useable shapes as would be appreciated by one of ordinary skill in the art having the benefit of this disclosure.

Figure 6A:
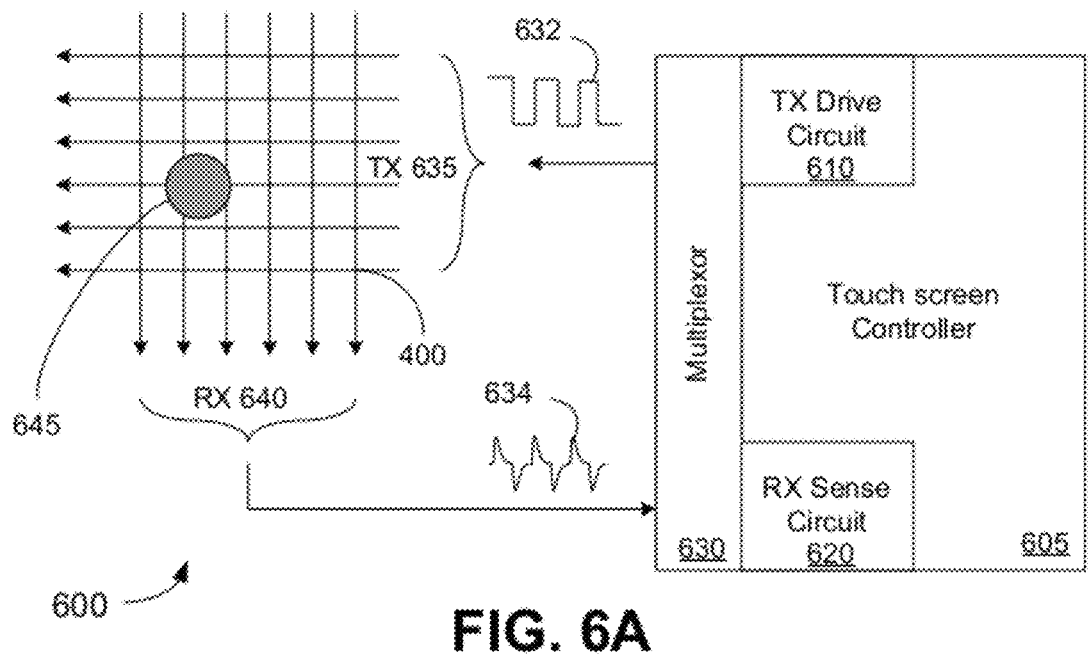
FIG. 6A is a block diagram illustrating one embodiment of a system including a capacitive sense array and a touch screen controller that converts measured capacitances to touch coordinates.

FIG. 6A is a block diagram illustrating one embodiment of a system 600 including the sense array 400 and a touch screen controller 605 that converts measured capacitances to touch coordinates. In an embodiment, the touch screen controller 605 is similar to the capacitance sensor 301 described above. In another embodiment, the touch screen controller 605 is the processing device 310. The sense array 400 includes TX lines 635 and RX lines 640. In an embodiment, the TX lines 635 and RX lines 640 are the TX electrodes 422 and RX electrodes 423 of FIG. 4, respectively. The touch screen controller 605 includes a TX drive circuit 610, an RX sense circuit 620, and a multiplexor 630.

In an embodiment, a passive object (e.g., a finger or other conductive object) touches the sense array 400 at contact point 645. The TX drive circuit 610 drives the TX lines 635 with TX signal 632. The RX sense circuit 620 measures the RX signal 634 on RX lines 640. In an embodiment, the touch screen controller 605 determines the location of contact point 645 based on the mapping techniques described above in conjunction with FIGS. 4-5. The TX lines 635 and RX lines 640 are multiplexed by multiplexor 630. The touch screen controller 605 provides the TX signal 632 on the TX lines 635 (rows) and measures the capacitance coupling on the RX lines 640 (columns). In an embodiment, the TX and RX lines 635, 640 are orthogonal and may be used interchangeably (e.g., transmitting on columns and receiving on rows). In an embodiment, the TX drive circuit 610 transmits the TX signal 632 through a high impedance ITO panel (TX lines 635), thus limiting the upper frequency limit and speed of the system. The total scan time may also dependent upon the number of TX lines 635 and RX lines 640 in the sense array 400. For example, the TX drive circuit 610 provides a TX signal 632 on each TX line 635 and simultaneously reads the capacitively coupled RX signal 634 on each RX line 640, according to one embodiment. In another embodiment, the RX lines 640 are multiplexed in two or more scans, as described in conjunction with FIG. 5B.

Figure 6B:
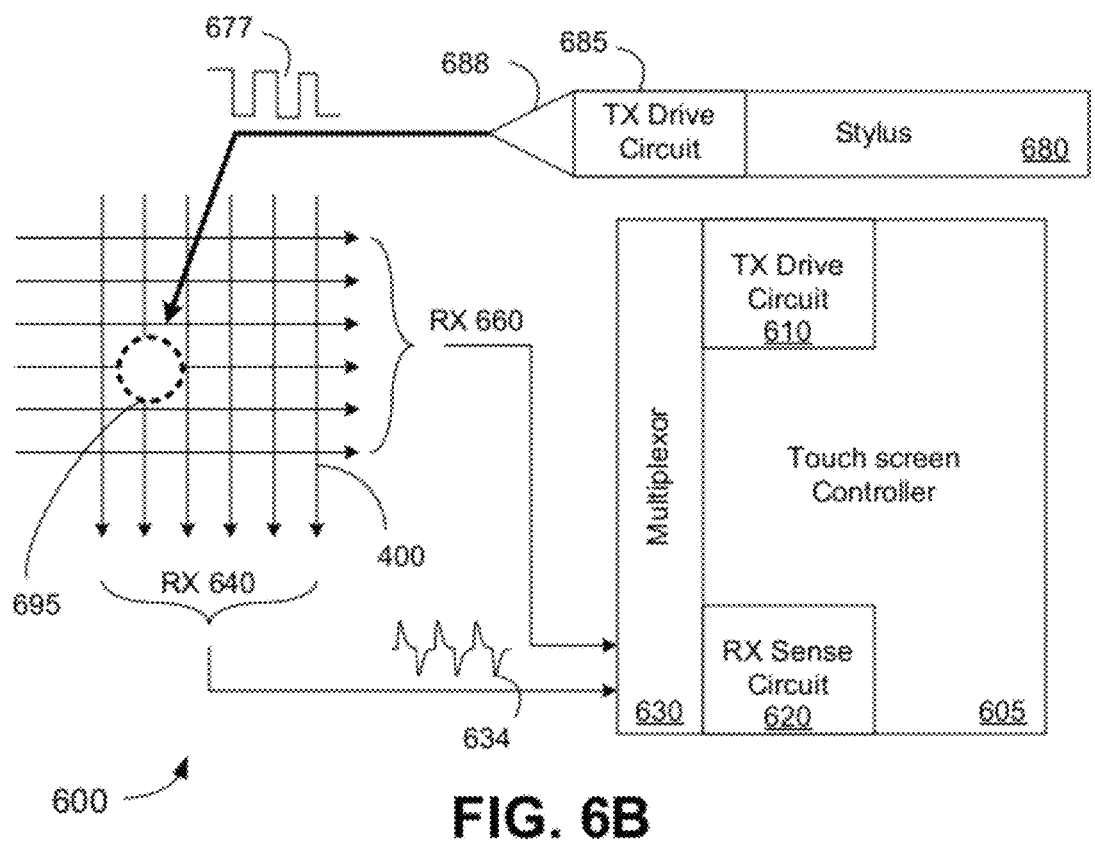
FIG. 6B is a block diagram illustrating one embodiment of a system including a capacitive sense array, a stylus, and a touch screen controller that converts measured capacitances to touch coordinates.
Figure 7:
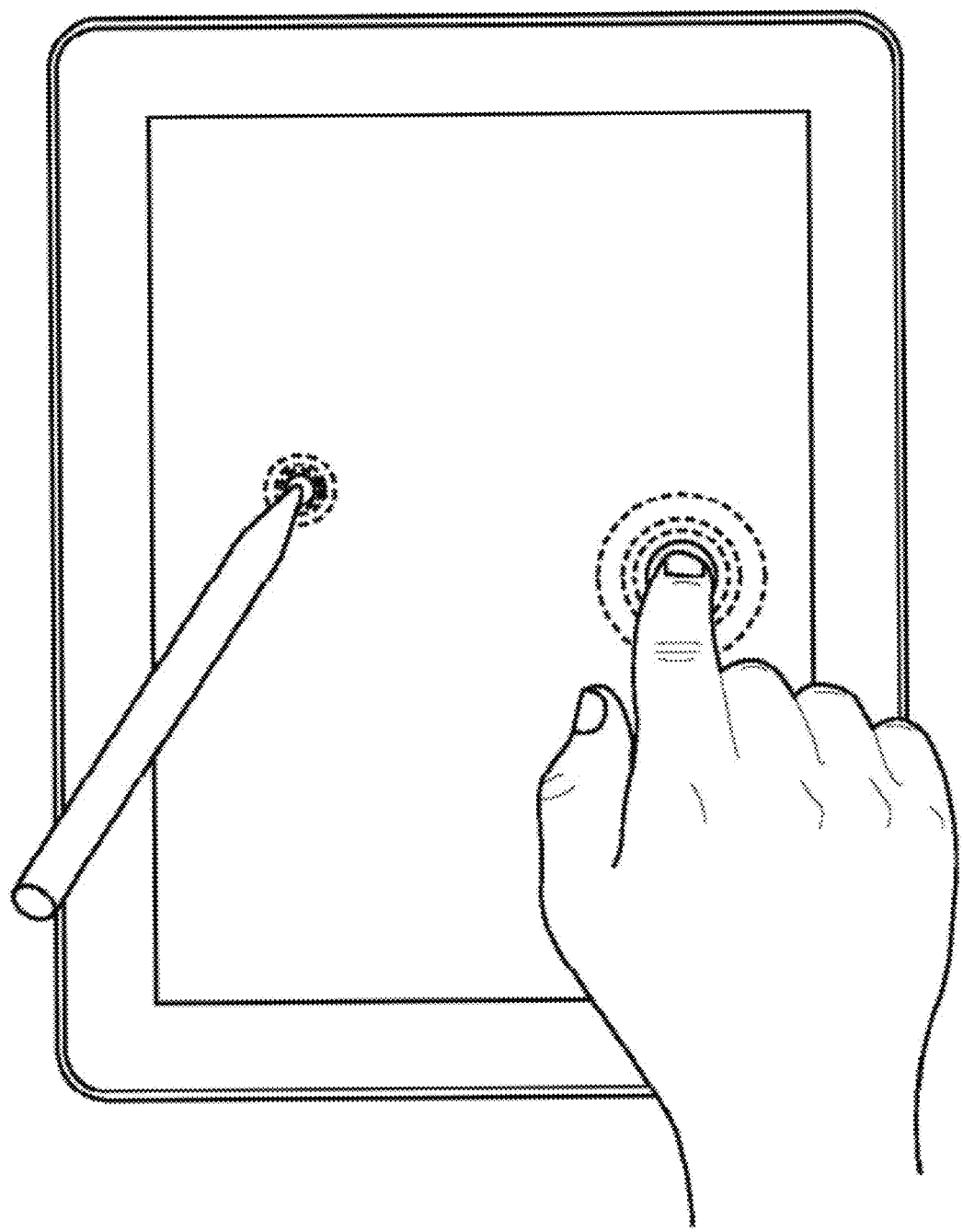
FIG. 7 illustrates the simultaneous use of a stylus and touch object on a capacitive sense array.

FIG. 6B is a block diagram illustrating one embodiment of a system 600 including the sense array 400, a stylus 680, and the touch screen controller 605 that converts measured capacitances to touch coordinates. The sense array 400 includes RX lines 640 and 660. The RX lines 660 are the same as TX lines 635 in FIG. 6A, but used as a receive channel in system 600 as further described below for stylus signal sensing. In an embodiment, RX lines 640 and 660 are similar to the TX electrodes 422 and RX electrodes 423 of FIG. 4. The touch screen controller 605 includes the TX drive circuit 610, the RX sense circuit 620, and the multiplexor 630. The stylus 680 includes a TX drive circuit 685 and a stylus tip 688.

In an embodiment, the stylus TX drive circuit 685 of stylus 680 provides a TX signal 677 directly to contact point 695 on sense array 400, thus eliminating the need to dedicate the RX 660 lines (previously TX 635 in FIG. 6A) to transmitting a TX signal from the TX drive circuit 610. As such, the RX sense circuit 620 measures the RX signal 634 on both the rows (RX lines 660) and columns (RX lines 640) of sense array. This results in faster position tracking because the TX signal no longer passes through the high impedance ITO lines, thus reducing the scan time to the total RX measurement. In one embodiment, the touch screen controller 605 performs a normal scan of the sense array 400 during RX sensing of TX signal from the TX drive circuit 610 (illustrated in FIG. 6A), and a stylus scan of the sense array 400 during RX sensing of the stylus TX signal 677 (illustrated in FIG. 6B). For the stylus scan, the touch screen controller 605 measures a charge being capacitively coupled to the row and column electrodes of the sense array from the stylus. To further illustrate, a mutual capacitance scan uses both a TX and RX signal 632, 634 to track an object. As described above, this is typically done by scanning the RX lines 640 for each driven TX line 635 in a successive fashion by the touch screen controller 605. In an array of N rows (TX signal) and M columns (RX signal), a complete scan would require N×M total scans if one RX line is sensed at a time. For example, transmitting a TX signal ("TX'ing") on row 1, and receiving a receive signal ("RX'ing") on columns 1-M, followed by TX'ing on row 2 and RX'ing on columns 1-M, and so on in sequential fashion. Alternatively, more RX lines can be sensed at a time. In one embodiment, 4 or 8 RX lines are sensed at a time, but in other embodiments, all RX lines may be sense simultaneously or sequentially. With multiple RX channels to sense more than one RX line at the same time, the complete scan would be (N*M)/(#RX channels). In contrast, a stylus scan does not require a TX signal by the TX drive circuit 610 and a complete scan would only require a single RX signal measurement on each row and column, or N+M scans, thus resulting in a significantly reduced stylus scanning time for the entire sense array as compared with mutual capacitance scanning time for the entire sense array. Like above, multiple RX channels can be used to sense multiple RX lines at the same time. In this case, the complete scan would be (N+M)/(#RX channels).

It should be noted that the embodiments described herein may use the same electrodes (e.g., ITO panel lines), which served the TX function for the touch scanning may be used for the RX function for the stylus sensing. It should also be noted that both stylus and finger sensing operate at the frequencies which are not attenuated largely by the sensing device (e.g., ITO panel).

As described above, a passive stylus may be used as a touch object to interface with the various touch screens described above. In contrast to passive styluses, an active stylus described herein provides the transmit ("TX") signal that is typically provided by the touch screen controller 605 in finger sensing modes, as described above in conjunction with FIGS. 6A and 6B.

The stylus 680 capacitively couples the stylus TX signal 677 to the sense array 400, as described above in conjunction with FIGS. 4-6. In an embodiment, the stylus signal amplitude, frequency, phase, etc., may be the same or similar to that which is utilized for finger sensing by the touch screen controller 605. Alternatively, the stylus TX signal may be different than the TX signal from the TX drive circuit 610, in amplitude, frequency, and phase. In another embodiment, the stylus TX signal may have a different code for code modulation than a code used in the TX signal from the TX drive circuit 610. In an exemplary embodiment, the stylus TX signal 677 has a greater amplitude than the finger sensing TX signal 632 from the TX drive circuit 610. For example, in one exemplary embodiment, the stylus TX signal 677 ranges from approximately 20-50V, as compared with the approximately 5-10V typically provided by the touch screen controller 605. Alternatively, other voltages may be used as would be appreciated by one of ordinary skill in the art. The higher stylus TX voltage couples more charge to the MC array 400 more quickly, thus reducing the amount of time required to sense each row and column of the sense array 400. Other embodiments may incorporate higher voltages on the MC array TX line 635 to obtain similar time efficiency improvements for finger sensing.

In an embodiment, the stylus 680 applies a higher frequency on the stylus TX signal 677 than the TX signal 632 frequency from TX drive circuit 610 to achieve a reduced sensing time. Charge may be capacitively coupled from the stylus 680 to the sense array 400 during the rising and falling edges of the stylus TX signal 677. Thus, a higher TX frequency provides a greater number of rising and falling edges over a given period of time, resulting in greater charge coupling. The practical upper limit of the TX frequency in finger sensing mode (e.g., TX signal on sense array 400 for finger sensing) is dependent upon the resistor-capacitor ("RC") time constant of the panel's individual sense elements and interconnect (not shown). This is typically due to high impedance materials (e.g. ITO) used in the fabrication of the sense array 400. A high-impedance sense array 400 may result in a high time constant and resulting signal attenuation of the rows (TX lines 635) and columns (RX lines 640) of sensors, which may limit the maximum sensing frequency. When using an active stylus to transmit the stylus TX signal 677 directly to a contact point on sense array 400, the stylus TX signal 677 does not have to pass through all of the high impedance path, and therefore the maximum operating frequency for the stylus TX signal 677 can be increased, as described above in conjunction with FIGS. 6A and 6B. For example, the time constant of the RX traces (both rows and columns) may be used to determine an upper frequency limit, but this will typically be is at least double the upper frequency limit used in finger sensing. Typically the impedance is half to the impedance when performing mutual capacitance scanning, since the row's impedance is eliminated and the column's impedance remains (or vice versa). It should be noted that both finger sensing and stylus sensing use frequency selection where the operation period should be smaller than the panel's time constant; so, restrictions for the operation frequency selection are approximately the same for finger and stylus sensing.

In an embodiment, the frequency of the stylus TX signal 677 is different than the frequency of the finger sensing TX signal 632. By using different TX frequencies, the touch screen controller 605 can differentiate between stylus TX signals and finger sensing TX signals. Alternatively, the touch screen controller 605 can differentiate the stylus TX signals from the TX drive circuit 610 TX signals 632 using other techniques as would be appreciated by those of ordinary skill in the art with the benefit of this disclosure, such as detecting the difference in signal characteristics (e.g., phase, frequency, amplitude, and code modulation).

Various embodiments described herein are applicable to any mutual capacitance touch screen system using an untethered, or wireless active stylus configured to be capacitively coupled to the mutual capacitance array, where the active stylus receives synchronization or timing data from the touch screen controller. For example, the stylus can generate the stylus TX signals according to the synchronization or timing data received from the touch screen controller.

Figure 8:
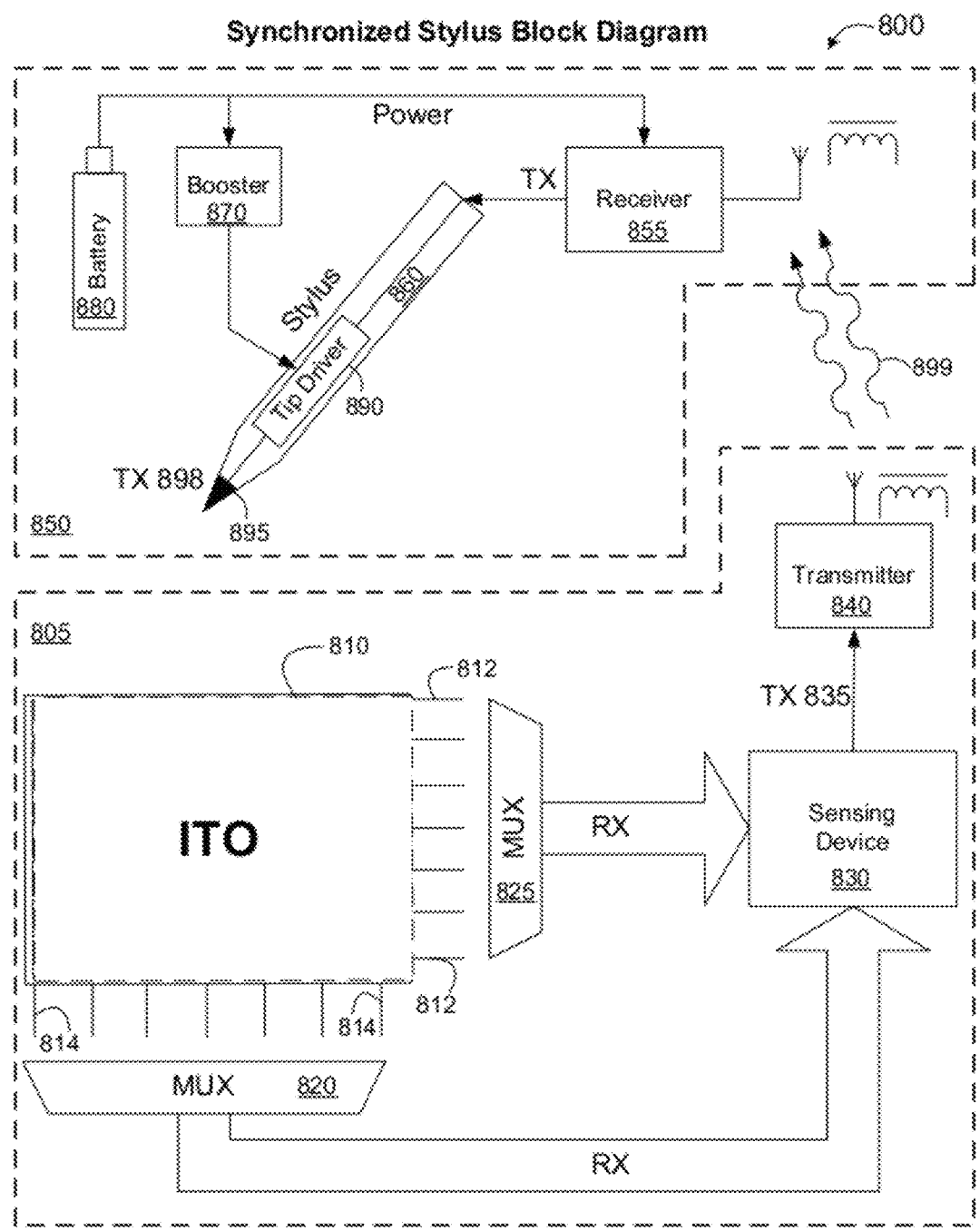
FIG. 8 is a block diagram illustrating one embodiment of an electronic system for synchronizing a stylus to a host device.

FIG. 8 is a block diagram illustrating one embodiment of an electronic system 800 for synchronizing a stylus 850 to a host device 805. The host device 805 includes a capacitive sense array 810, multiplexor ("MUX") devices 820 and 825, sensing device 830, and transmitter 840. In an embodiment, the capacitance sense array 810 is an all-points addressable mutual capacitance sense array (e.g., sense array 400). In yet another embodiment, the capacitive sense array 810 is an ITO panel. The capacitive sense array 810 ("sense array 810" or "ITO 810") is composed of rows 812 and columns 814 of electrodes as described in conjunction with FIG. 4. In an embodiment, the rows 812 and column 814 are the TX lines 635 (alternatively RX lines 640) and RX lines 640 of FIGS. 6A and 6B. The rows 812 and columns 814 are coupled to the MUX's 825 and 820, respectively. MUX's 820, 825 are coupled to the sensing device 830. The sensing device 830 is coupled to the transmitter 840. In an embodiment, the sensing device 830 performs a similar function as the capacitive sense circuit 301 of FIG. 3. In another embodiment, the sensing device 830 is the touch screen controller 605 of FIGS. 6A and 6B.

In the depicted embodiment, the stylus block 850 comprises a receiver 855, a battery 880, a booster 870, a tip driver 890, and a stylus tip 895. The stylus block 850 represents the components that are housed within the stylus body 860 as depicted in FIG. 8. The battery 880 is coupled to the booster 870 and receiver 855. The booster 870 is coupled to the tip driver 890.

In an embodiment, the sensing device 830 generates and couples a TX signal 835 to the transmitter 840. The transmitter 840 wirelessly couples the TX signal 835 to the receiver 855. In one embodiment, the transmitter 840 inductively couples the TX signal 835 to the receiver 855. In other embodiments, the transmitter may wirelessly couple the TX signal 835 in a variety of ways including radio frequency, optical, ultrasound, and other mediums that would be appreciated by one of ordinary in the art. The receiver 855 receives TX signal 899 from the transmitter 840 and couples demodulated TX signal to the stylus 850.

In one embodiment, the TX 835 signal sent by the transmitter 840 is the same signal as the TX signal generated and applied to the ITO 810 on the TX lines 812 (or 814) during finger position tracking. Alternatively, the TX signal 835 may be a different signal than the TX signal generated and applied to the ITO 810 and may have different signal characteristics (e.g., different frequency, phase, or code modulation). In another embodiment, the transmitter 840 sends a synchronization signal 899, or timing data, whereby the stylus 850 generates the stylus TX signal 898 based on the synchronization signal 899 received by the receiver 855 from the transmitter 840. In an embodiment, the synchronization signal 899 has different signal characteristics than the TX signal generated and applied to the ITO 810 during finger position tracking.

In an embodiment, the battery 880 voltage may be provided by battery cells (e.g., 1.5V AAA cells). The booster 870 boosts the battery voltage delivered to the tip driver 890, allowing the tip driver 890 to amplify the TX signal 835 to a higher voltage (e.g., 10V-20V). A high voltage stylus TX signal 898 may enable the host device 805 to detect the stylus 850 when it is "hovering," or in close proximity to the capacitive sense array 810, but not physically touching an overlay disposed over the capacitive sense array 810. A high voltage stylus TX signal 898 may also provide for faster and more robust detection by the sensing device 830. Hover touch recognition is described in conjunction with FIG. 21.

The stylus 850 capacitively couples the amplified stylus TX signal 898 from the stylus tip 895 to the capacitive sense array 810. The rows 812 and columns 814 of electrodes (configured as RX electrodes in stylus position tracking mode) sense the stylus TX signals 898 and send the received stylus TX signals 898 to the sensing device 830 via MUX's 820 and 825. In an embodiment, the stylus TX signals 898 are referred to as RX signals once they are sensed by the rows 812 and/or columns of electrodes on the ITO 810. As shown, the sensing device 830 receives the stylus TX signal 898 by RX'ing on both the rows 812 and columns 814 of electrodes of capacitive sense array 810, as described above in conjunction with FIG. 6B (i.e., RX lines 640 and 660). In an embodiment, the sensing device 830 performs a stylus scan of the rows 812 and columns 814 of capacitance sense array 810 when sensing the stylus TX signal 898. The sensing device 830 determines the location of the stylus 850 based on the relative strength of the TX signal 898 on each of the rows 812 and columns 814 elements of the capacitance sense array 810, as previously described in conjunction with FIGS. 4-6.

The synchronized operation of the host 805 and stylus 850 enables the sensing device 830 to substantially simultaneously track a passive touch object (e.g., finger) and stylus 850 on the sense array 810. Synchronization ensures that the stylus 850 transmits a stylus TX signal 898 during a period when the sensing device 830 is not TX'ing for passive touch object sensing.

Figure 9A:
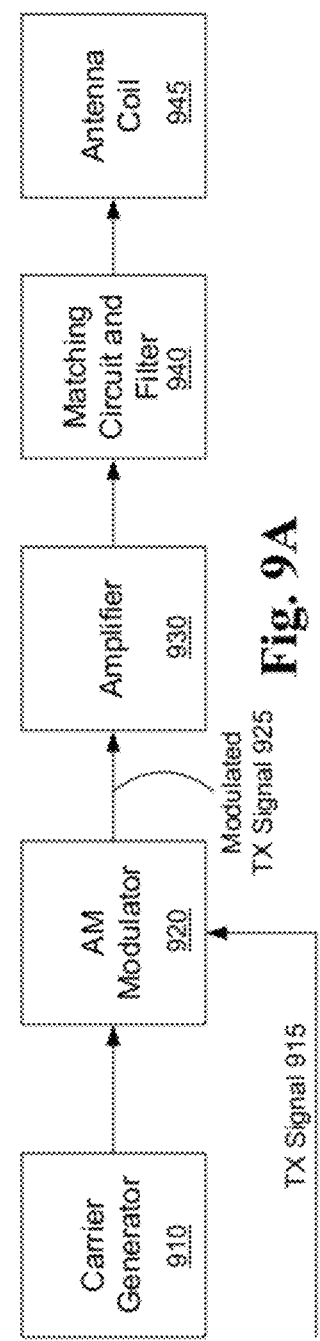
FIG. 9A is a block diagram illustrating one embodiment of transmitter configured to transmit a transmit ("TX") signal from a host device to a stylus.

FIG. 9A is a block diagram illustrating one embodiment of transmitter 900 configured to transmit a TX signal 915 from a host device 805 to a stylus 850. The transmitter 900 comprises a carrier generator 910, an amplitude modulation ("AM") modulator 920, an amplifier 930, a matching circuit and filter 940, and antenna coil 945.

In an embodiment, the carrier generator 910 is a local oscillator that generates a predetermined carrier frequency. The carrier generator may utilize a ring oscillator, a relaxation oscillator, a crystal oscillator, etc., or other oscillators that would be known by one of ordinary skill in the art. The carrier frequency may be significantly higher than the TX signal 915. In one embodiment, the carrier generator 910 generates a carrier frequency of 13.56 MHz (radio-frequency identification (RFID) standard), whereas the TX signal 915 frequency may be approximately 100 kHz to 500 kHz. In an embodiment, the TX signal 915 may be generated by frequency dividing the carrier signal or by a separate oscillator circuit. In another embodiment, a circuit within the processing device 310 of FIG. 3 generates the TX signal 915.

According to one embodiment, the AM modulator 920 receives the carrier frequency from the carrier generator 910 and modulates its amplitude with the TX signal 915. In one embodiment, the synchronization signal 899 is modulated with the carrier frequency from the carrier generator 910. Although amplitude shift-keying ("ASK") is described herein, other types of modulation schemes may be used (e.g., frequency shift keying ("FSK"), phase-shift keying ("PSK"), binary phase shift keying ("BPSK")) and would be known by one of ordinary skill in the art. The amplifier 930 amplifies the modulated TX signal 925 and sends the amplified TX signal to the matching circuit and filter 940. In an embodiment, the amplifier 930 amplifies the modulated TX signal 925 to a sufficiently high amplitude to accommodate the high attenuation typically associated with wireless transmission, as would be appreciated by one of ordinary skill in the art. The matching circuit and filter 940 provides impedance matching between the amplifier 930 and the antenna coil 945, filtering out any unwanted frequencies on the modulated TX signal 925. For example, a high pass or band pass filter may be used to remove unnecessary noise or harmonics in the modulated TX signal 925.

The antenna coil 945 wirelessly broadcasts the filtered and modulated TX signal 925. In an embodiment, the antenna coil 945 may broadcast the modulated TX signal 925 in a variety of formats including, but not limited to, radio frequency ("RF"), inductance, optics, electrostatic coupling, and ultrasound. In one embodiment, the transmitter 900 modulates the TX signal 915 with an RF carrier wave (e.g., 433 MHz, 900 MHz, or 2.4 GHz). In another embodiment, the transmitter 900 utilizes an inductive link to inductively couple the lower frequency RFID modulated carrier wave (modulated TX signal 925) to the inductive receiver 950. Inductively coupling an RFID carrier frequency generally consumes less power than an RF carrier wave and may provide longer battery life in the stylus. In some embodiments, using an RFID carrier frequency may provide significant advantages. For example, there are no broadcast licensing requirements associated with broadcasting RFID frequencies worldwide. Furthermore, at RFID frequencies, the metal stylus case and stylus tip may function as additional electric field antennas, providing for a more robust receiver block. In one embodiment, the RFID carrier frequency is frequency divided to generate the TX signal 915, thus providing good noise suppression at the receiver block.

Figure 9B:
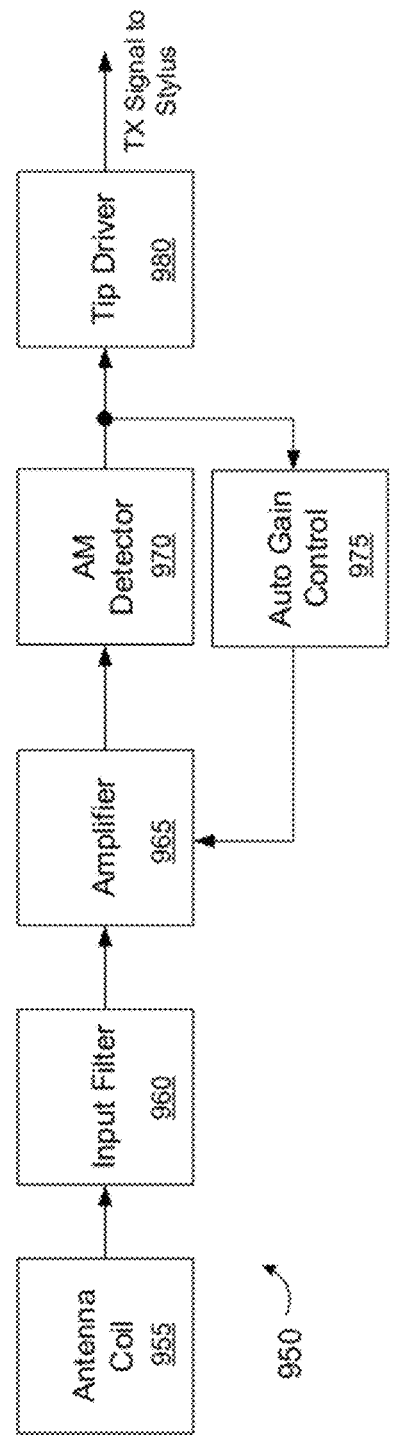
FIG. 9B is a block diagram illustrating one embodiment of a stylus receiver configured to receive a TX signal from a host device.

FIG. 9B is a block diagram illustrating one embodiment of a stylus receiver 950 configured to receive the modulated TX signal 925 from a host device 805. The receiver 950 comprises an antenna coil 955, an input filter 960, an amplifier 965, an AM detector 970, an auto gain control block 975, and a tip driver 980. In an embodiment, the transmitter 900 and stylus receiver 950 are similar to the transmitter 840 and receiver 855 of FIG. 8, respectively. Alternatively, other circuit configurations for transmitters and receivers may be used as would be appreciated by one of ordinary skill in the art having benefit of this disclosure.

The antenna coil 955 receives the AM modulated TX signal 925 wirelessly coupled from the transmitter 900. The modulated TX signal 925 is typically attenuated by losses inherently associated with wireless transmission. The input filter 960 may be used to filter out noise, unnecessary harmonics, and other unwanted signals from the modulated TX signal 925. The amplifier 965 amplifies the modulated TX signal 925 to logic levels that are detectable by the AM detector 970. The AM detector 970 demodulates the modulated TX signal 925 (e.g., removes the carrier frequency (e.g., 13.56 MHz)), thus leaving the TX signal 915 remaining. The auto gain control block 975 provides an automatic gain control loop to maintain a constant TX signal amplitude over a wide-input-signal voltage range. The tip driver 980 further amplifies the TX signal 915 to a high voltage output (10V-20V) for capacitively coupling the TX signal to the capacitive sense array 810, as described above in conjunction with FIG. 8.

In an alternative embodiment, a stylus is configured to operate as the timing "master," and has a transmitter similar to transmitter 900 to send synchronization information to the host, which would include a receiver similar to receiver 950. In another embodiment, the stylus and/or the host may each include transceivers that allow for bi-directional communication. It should be noted that the communication between the host and the stylus for synchronization is done on a communication channel or communication link. The communication channel or link may be considered a backchannel that is used to communication data between the host and stylus. The communication data may include synchronization information as described herein, as well as additional data, such as force data, button data, or the like. The communication channel or link may be a RF link, Bluetooth link, an optical link, an infrared (IR) link, or other communication channels/links as would be appreciated by one of ordinary skill in the art having the benefit of this disclosure.

When the stylus 850 operates as the timing "master," the stylus 850 sends the carrier modulated TX signal 925 to the host. A carrier generator, frequency divider, and modulator on stylus 850 provide a modulated TX signal to the host, where the host is synchronized to operate at the same phase and frequency as the stylus TX signal. The modification required for system 800 to synchronize the host to a master stylus TX signal would be appreciated by one having ordinary skill in the art with the benefit of this disclosure.

Figure 10A:
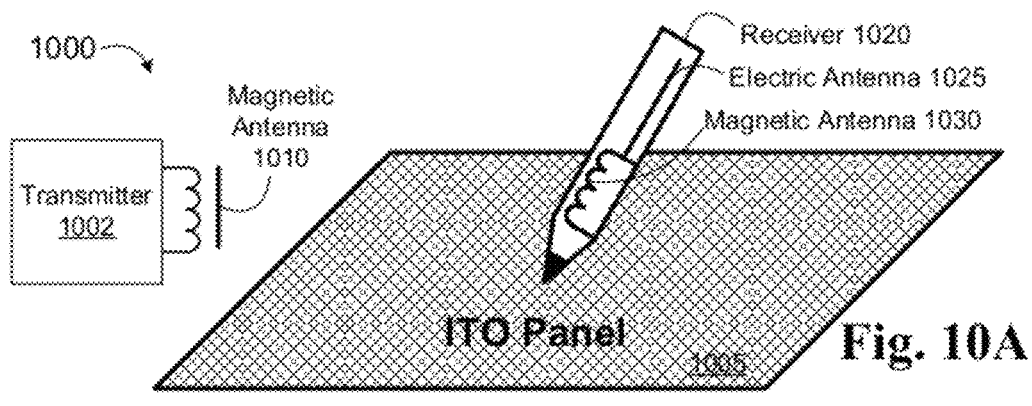
FIG. 10A is a block diagram illustrating one embodiment of a transmitter antenna system for wirelessly coupling a TX signal from a host device transmitter to a stylus receiver.

FIG. 10A is a block diagram illustrating one embodiment of a transmitter antenna system 1000 for wirelessly coupling a TX signal from a host device transmitter 1002 to a stylus receiver 1020. The system 1000 includes an ITO capacitance sense array ("ITO panel") 1005, a host transmitter 1002, and a stylus receiver 1020. The host transmitter includes a magnetic antenna 1010. The stylus receiver 1020 includes a stylus electric antenna 1025 and a stylus magnetic antenna 1030. The host magnetic antenna 1010 inductively couples a TX signal (not shown) to the stylus receiver 1020. The TX signal is received by the electric antenna 1025 and magnetic antenna 1030. The host magnetic antenna 1010 is a very compact antenna that can be easily integrated into existing designs and does not require any alteration to the ITO panel 1005 for implementation. The antenna system 1000 may be well-suited for stylus-ITO panel systems having a maximum range of approximately 10 cm (4 inches).

Figure 10B:
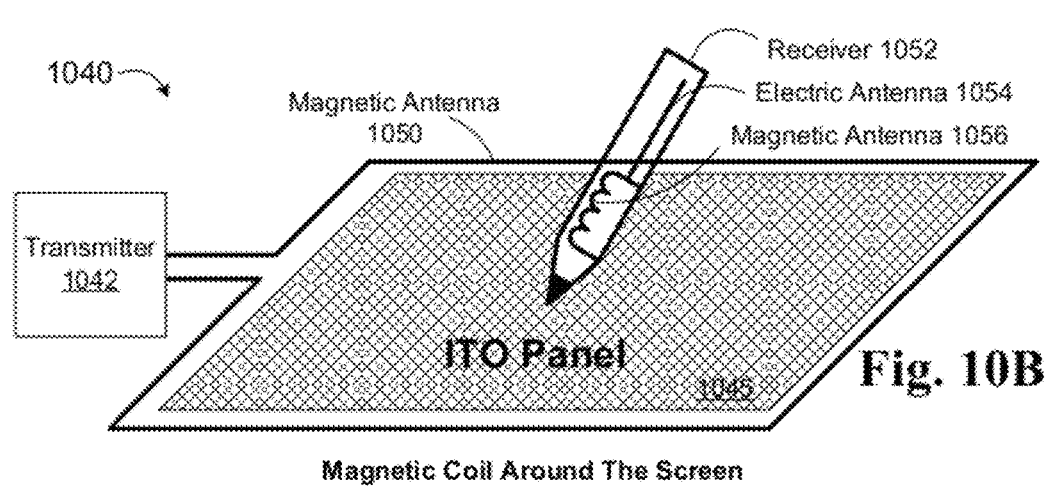
FIG. 10B is a block diagram illustrating one embodiment of a transmitter antenna system for wirelessly coupling a TX signal from a host device transmitter to a stylus receiver.

FIG. 10B is a block diagram illustrating one embodiment of a transmitter antenna system 1040 for wirelessly coupling a TX signal from a host device transmitter 1042 to a stylus receiver 1052. The system 1040 includes an ITO panel 1045, a host transmitter 1042, and a stylus receiver 1052. The host transmitter 1042 includes a host magnetic antenna 1050. The stylus receiver 1052 includes a stylus electric antenna 1054 and a stylus magnetic antenna 1056. In an embodiment, the host magnetic antenna 1050 is configured around the outer edge of ITO panel 1045. The host magnetic antenna 1050 inductively couples a TX signal (not shown) to the stylus receiver 1052. The TX signal is received by the electric antenna 1054 and magnetic antenna 1056. The host magnetic antenna 1050 may have a maximum transmission range of approximately 20 cm (8 inches), which may be well-suited for 15 inch ITO panels. In an embodiment, the host magnetic antenna 1050 may require increasing the screen border (ITO panel housing) to accommodate both the ITO panel 1045 and the host magnetic antenna 1050.

Figure 10C:
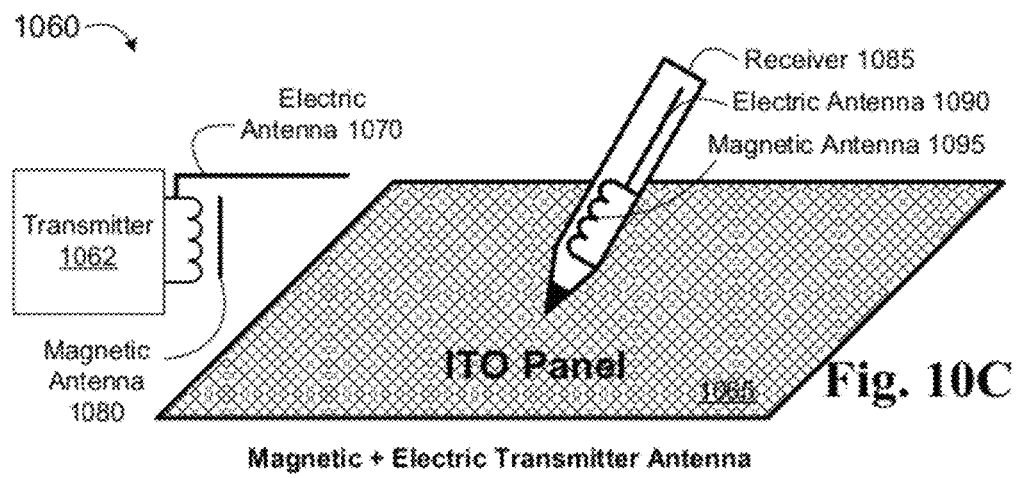
FIG. 10C is a block diagram illustrating one embodiment of a transmitter antenna system for wirelessly coupling a TX signal from a host device transmitter to a stylus receiver.

FIG. 10C is a block diagram illustrating one embodiment of a transmitter antenna system 1060 for wirelessly coupling a TX signal from a host device transmitter 1062 to a stylus receiver 1085. The system 1000 includes an ITO panel 1065, a host transmitter 1062, and a stylus receiver 1085. The host transmitter 1062 includes a host magnetic antenna 1080 and a host electric antenna 1070. The stylus receiver 1085 includes a stylus electric antenna 1090 and a stylus magnetic antenna 1095. The host magnetic antenna 1080 and host electric antenna 1070 couple a TX signal (not shown) to the stylus receiver 1085. The TX signal is received by the electric antenna 1090 and magnetic antenna 1095. The host electric antenna 1070 may be a 10 cm long wire configured in close proximity to the screen border (ITO panel housing) with a maximum transmission range of approximately 20 cm. In an embodiment, the host electric antenna 1070 is implemented on a printed circuit board ("PCB") which may not require any alternations to the ITO panel housing. The antennas have been depicted as coil and loop antennas, however, various types of antennas may be used, such as slot antennas, patched antennas, dipoles, folded dipoles, mono pole, as well as other types of antennas as would be appreciated by one of ordinary skill in the art having the benefit of this disclosure. The transmission of data using these antennas may be done using any modulation technique as described herein.

Figure 11:
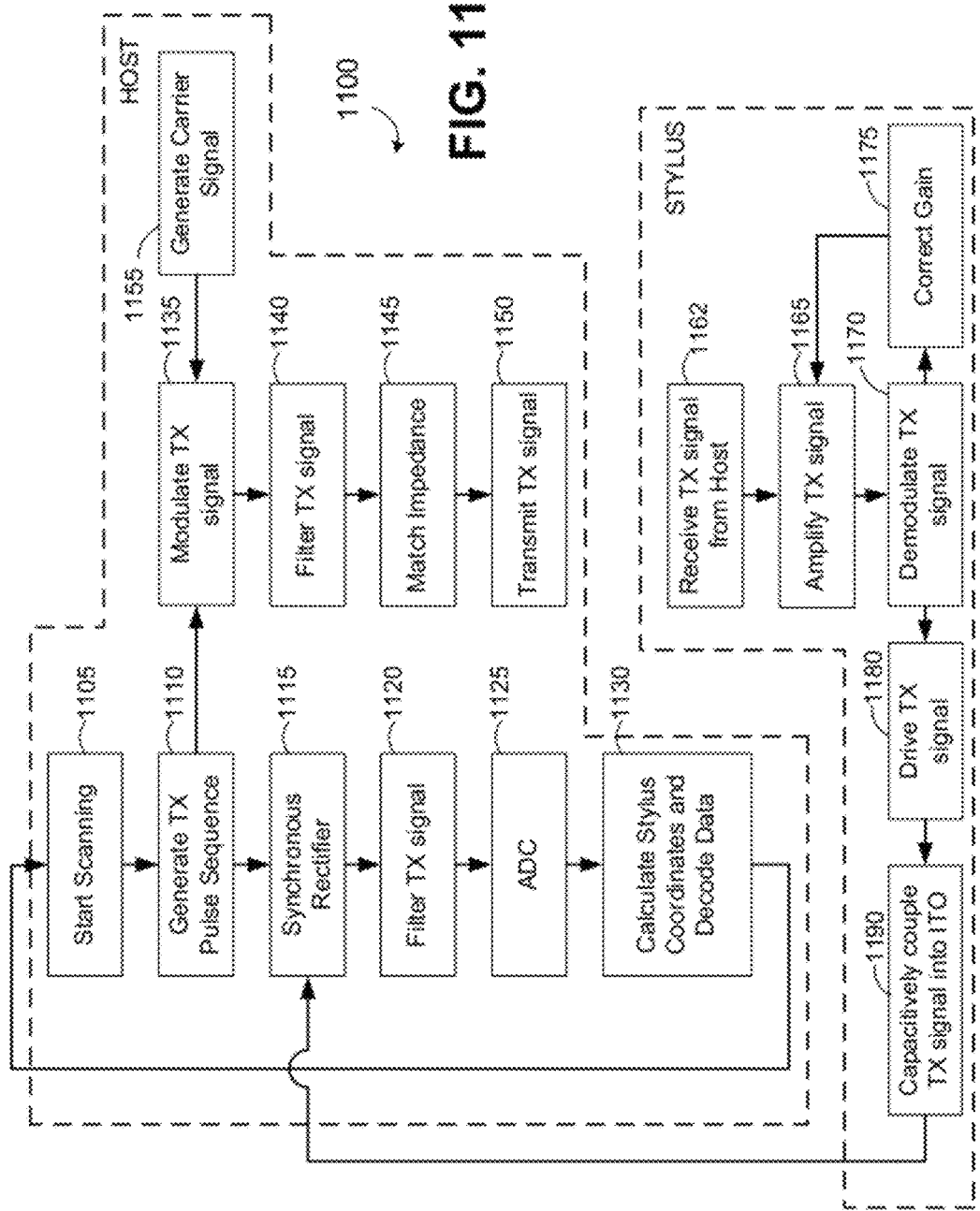
FIG. 11 is a flow chart of one embodiment of a method of synchronizing a stylus to a host device.

FIG. 11 is a flow chart of one embodiment of a method 1100 of synchronizing a stylus to a host device. The method 1100 begins with the host device starting the scanning process (block 1105). The sensing device generates a TX pulse sequence (block 1110). In an embodiment, the TX pulse sequence is a pulse train of TX signals. At block 1155, the carrier generator generates a carrier signal (e.g., 13.56 MHz RFID carrier frequency). The AM modulator modulates the carrier signal (block 1135) with the TX pulse sequence generated at block 1110. In other embodiments, the host device may implement other modulation schemes, as described in conjunction with FIG. 9A. A band pass filter filters the modulated TX signal (block 1140). It should be noted that other types of filters may be used including low pass, high pass, notch filters, and others as would be appreciated by those of ordinary skill in the art. At block 1145, a matching network matches the impedance of the filter and antenna, and the transmit block wirelessly transmits the modulated TX signal to the stylus (block 1150).

The receiver block of the stylus wirelessly receives the modulated TX signal from the host device (block 1162). The amplifier block amplifies the modulated TX signal (block 1165), and the AM demodulator removes the carrier frequency from the TX signal (block 1170). The gain correction block dynamically adjusts the gain of the amplifier to maintain a predetermined TX signal magnitude at the input of the demodulator (block 1175). At block 1180, the TX driver drives (amplifies) the TX signal. In one embodiment, the TX driver amplifies the TX signal to approximately 20-50V to improve the capacitive coupling between the stylus and sense array and enable hover detection capabilities by the host device (block 1180). The stylus tip capacitively couples the amplified TX signal (stylus TX signal) to the ITO panel (block 1190).

At block 1115, the synchronous rectifier receives the stylus TX signal. A filtering block may be configured to operate as a low-pass filter (LPF) and integrate the rectified stylus TX signal to remove unwanted noise, harmonics, etc., (block 1120). An analog-to-digital ("ADC") converter converts the analog stylus TX signal to a digital representation for further digital processing on the host CPU or other processing device (block 1125). At block 1130, the host CPU calculates the stylus coordinates, processes any additional data, and the scanning process repeats (block 1105). In an embodiment, the additional data may include force data, button data, or other additional functionality encoded by stylus onto the stylus TX signal, as further described with reference to FIGS. 13-18.

Figures 12A, 12B:
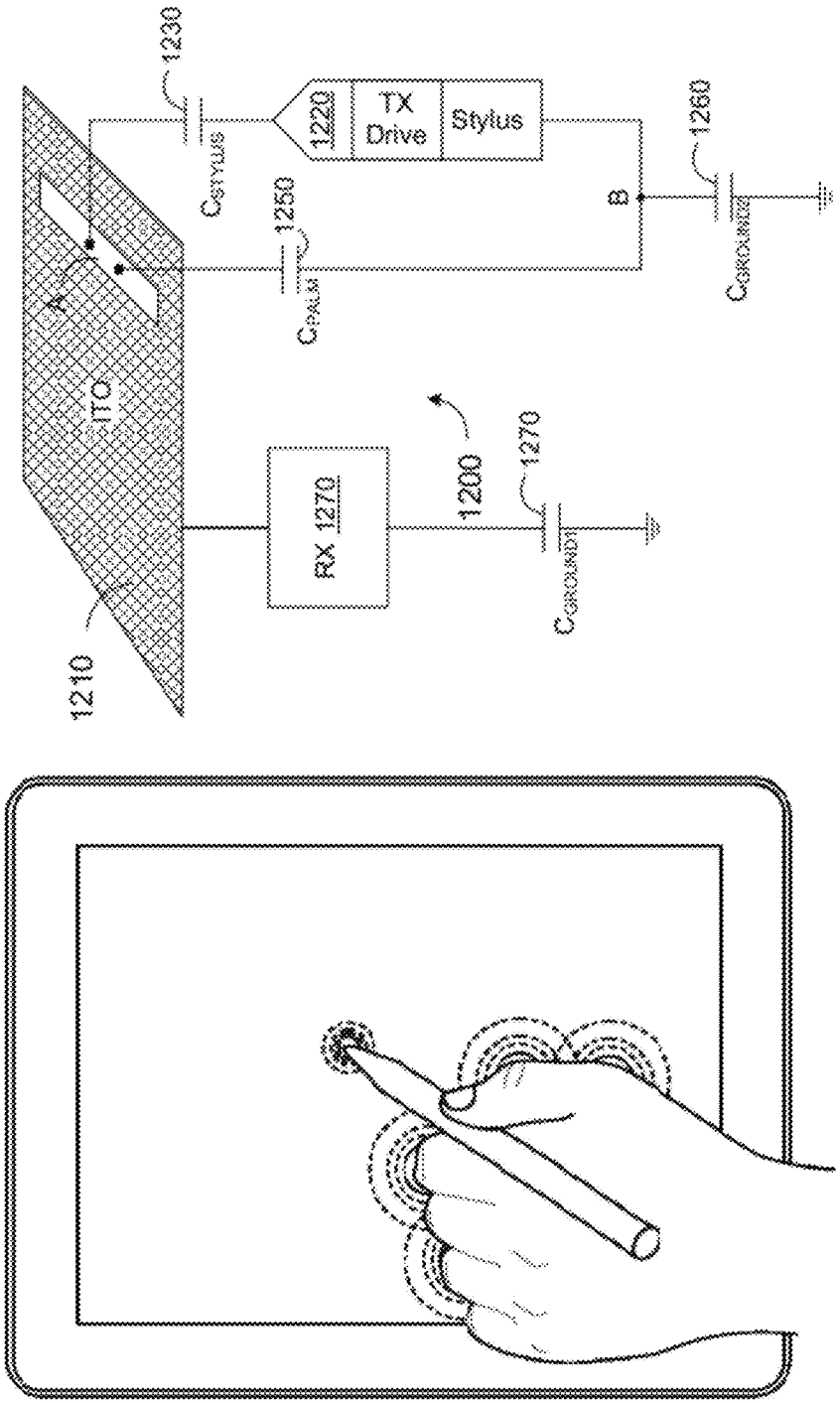
FIG. 12A is a diagram illustrating the electrical effect of a stylus and palm simultaneously contacting an ITO panel.
FIG. 12B is a block diagram illustrating the electrical equivalent circuit diagram of a palm and stylus on an ITO panel, according to an embodiment.

FIG. 12A is a diagram illustrating the electrical effect of the stylus 850 and palm simultaneously contacting an ITO panel 810. In an embodiment, system 800 performs a palm rejection feature that enables the sensing device 830 to accurately track the position of a stylus 680 with a hand or palm simultaneously present on the ITO panel 810. This condition may occur, for example, when a user inputs their signature with the stylus while supporting their hand or palm on the ITO panel 810.

FIG. 12B is a block diagram 1200 illustrating the electrical equivalent circuit diagram of a palm and stylus on an ITO panel 1210, according to an embodiment. The block diagram includes an ITO panel 1210, capacitive sense element A, a stylus 1220, a stylus-to-panel capacitance ("C_stylus") 1230, palm-to-panel capacitance ("C_palm") 1250, an RX circuit 1270, receive circuit to ground capacitance C_ground1 1270 and the capacitance from point B to electrical ground ("C_ground2 1260"). The C_ground1 1270 capacitance is own device capacitance. The C_ground2 1260 capacitance is own stylus capacitance. The stylus 1220 and palm (not shown) contact the ITO panel 1210 at capacitive sense element A. C_Stylus 1230 is the capacitance of the stylus 1220 when the stylus 1220 is capacitively coupling a stylus TX signal to the ITO panel 1210. The palm capacitance 1250 is the capacitance of a hand or palm contacting the surface of the ITO (illustrated in FIG. 12A). The casing or enclosure of the stylus is the local ground for the stylus 1220. C_ground2 1260 is the capacitance of the human body from the node ("B") where the palm contacts the casing of stylus 1220. In an embodiment, the palm may couple a parasitic TX charge on the ITO panel 1210 which can significantly affect the TX stylus signal measured by the RX circuit 1270. The magnitude of C_palm 1250 is approximately zero when hovering over the ITO panel 1210. When touching the ITO panel 1210, the capacitive influence of the palm depends on the magnitude of C_palm 1250 and C_stylus 1230. The human body is connected to ground return path via some finite capacitance C_ground2 1260. It means that palm is not really grounded and always has some TX potential too. This potential may cause small signal changes when hand is on the panel due capacitive coupling with panel. The stylus tip TX signal is much stronger then palm TX signal. It allows us separate stylus and palm touches by signal level thresholds without problems.

Palm rejection is achieved due to the inherent properties of synchronizing the host and stylus so that finger position tracking and stylus position tracking may be performed simultaneously without interfering with one another. For example, during stylus tracking, the stylus may capacitively couple the stylus TX signal to the ITO 1210 proximal to the location of the stylus. Thus, a palm (i.e., a passive touch object) would not interfere with stylus position tracking in a noticeable way because the palm would not be stimulated by the TX signal originating from the TX drive circuit of the touch screen controller (e.g., TX drive circuit 610 of touch screen controller 605, or sensing device 830 of host 805). It should be noted that the palm has much smaller stylus TX signal propagation as compared to the stylus tip. The palm influence on TX signal is close to own system noise floor and can be easily removed.

Figure 13:
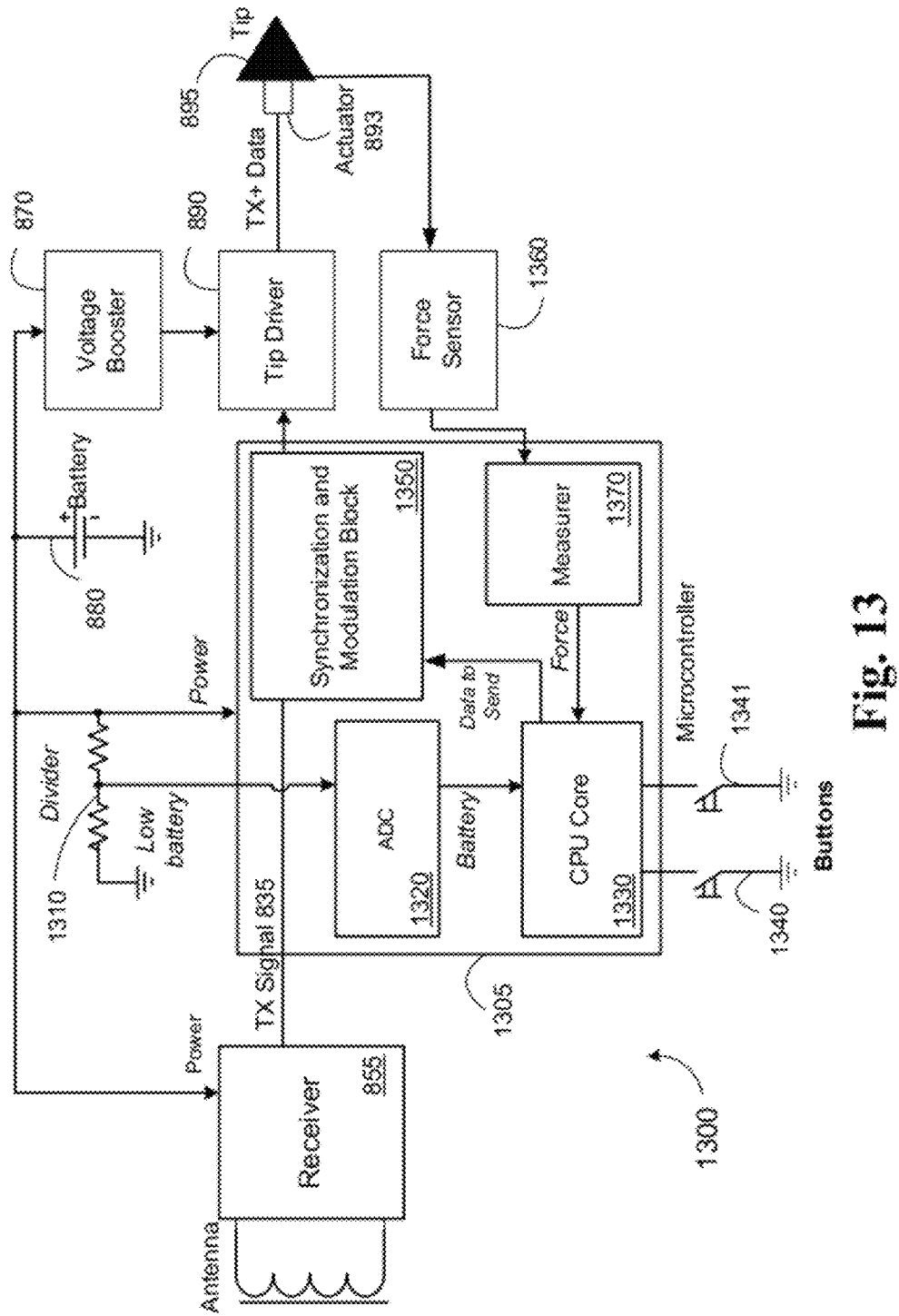
FIG. 13 is a block diagram illustrating one embodiment of a stylus for synchronizing and modulating additional data into a stylus TX signal.

FIG. 13 is a block diagram illustrating one embodiment of a stylus 1300 for synchronizing and modulating additional data into a stylus transmit signal 898. The stylus 1300 includes a receiver 855, microcontroller block 1305, voltage booster 870, battery 880, tip driver 890, actuator 893, stylus tip 895, voltage divider 1310, and force sensor 1360. In one embodiment, the microcontroller block 1305 includes ADC 1320, CPU core 1330, buttons 1340 and 1341, synchronization and modulation block ("synch mod block") 1350, and measurer 1370.

In an embodiment, the synch mod block 1350 is configured to modulate additional data into the TX signal 835. Some types of additional data that may be modulated into the stylus TX signal 835 include battery data, acceleration data, button data, force data, and other data as would be appreciated by one of ordinary skill in the art having the benefit of this disclosure.

In one embodiment, if no modulation of additional data is required on the stylus TX signal 898, the stylus 1300 operates similar to the stylus block 850 of FIG. 8. In particular, the receiver 855 wirelessly receives the TX signal 835, the synch mod block 1350 receives the TX signal 835 from the receiver 855, the tip driver 890 drives or amplifies the TX signal 835, and the stylus tip 895 capacitively couples the amplified stylus TX signal 898 to the sense array 810. In an embodiment, the synch mod block 1350 may be bypassed if no modulation of additional data in the stylus TX signal 898 is required.

In an embodiment, the stylus 1300 modulates battery data (e.g., battery charge status) into the stylus TX signal 835. In one embodiment, the battery data may be obtained by using a voltage divider and ADC. In particular, the voltage divider 1310, which may be a resistor divider network as shown in FIG. 13, measures an analog voltage potential (e.g., at the resistor divider midpoint) of the battery 880, and the ADC 1320 converts the measured analog voltage potential to a digital value and sends it to the CPU core 1330. The CPU core 1330 processes the digital value and sends it to the synch mod block 1350. The synch mod block 1350 modulates the battery data into the stylus TX signal 835. The tip driver 890, in conjunction with the voltage booster 870, amplifies the modulated stylus TX signal 835. The stylus tip 895 capacitively couples the modulated stylus TX signal 898 to the sense array 810. In other embodiments, the synch mod block 1350 may modulate other types of additional data into the stylus TX signal 835 in addition to the battery data, such as button data described below.

In one embodiment, the stylus 1300 includes buttons 1340 and 1341. Buttons may provide additional functionality to the stylus including, but not limited to, "left click" and "right click" functions, similar to that of a computer mouse. Buttons 1340 and 1341 of stylus 1300 are coupled to the CPU core 1330. The buttons 1340, 1341, may be mechanical, electrical, capacitive, or other types that would be known by one of ordinary skill in the art. The CPU core 1330 processes the button input data and sends it to the synch mod block 1350. The synch mod block 1350 modulates the button data into the stylus TX signal 835. The tip driver 890, in conjunction with the voltage booster 870, amplifies the modulated stylus TX signal 835 and the stylus tip 895 capacitively couples the modulated stylus TX signal 898 to the sense array 810. In an embodiment, the synch mod block 1350 may modulate one or more other types of additional data into the stylus TX signal 835 in addition to the button data and/or battery data, such as the force data described below.

In an embodiment, force sensing is implemented in the stylus 1300. Force sensing provides additional data relating to the stylus tip 895 contact pressure on the sense array 810. The force sensor 1360 detects the force applied to the actuator 893. The measurer 1370 determines the amount of force (e.g., magnitude of force signal) applied to the tip 895. The CPU core 1330 processes the force signal and sends it to the synch mod block 1350. The synch mod block 1350 modulates the force data into the stylus TX signal 835. The tip driver 890, in conjunction with the voltage booster 870, amplifies the modulated stylus TX signal 835 and the stylus tip 895 capacitively couples the modulated stylus TX signal 898 to the sense array 810. Force sense may be detected by either a passive sensor (e.g., force sensing resistor) or active sensor (e.g., capacitive linear position sensor or a moving element in relation to a coil) within the stylus 1300. Alternatively, other methods may be used to quantitatively determine and digitize a force applied to the stylus tip 895, as would be appreciated by one of ordinary skill in the art. In an embodiment, the synch mod block 1350 may modulate one or more other types of additional data into the stylus TX signal 835 in addition to the force data. For example, in another embodiment, the orientation or acceleration of the stylus may be detected (e.g., by an accelerometer) and encoded in the stylus TX signal 835.

In an embodiment, the synch and mod block 1350 may modulate the additional data by way of frequency modulation ("FM"), frequency-shift keying ("FSK"), amplitude modulation ("AM"), amplitude-shift keying ("ASK"), on-off keying ("OOK"), pulse position modulation, phase modulation ("PM"), Manchester encoding, direct sequence spread spectrum ("DSSS"), or other modulation schemes that would be appreciated by one of ordinary skill in the art. PM modulation may further include binary phase shift keying ("BPSK") or quadrature phase shift keying ("QPSK") encoding schemes which are further discussed below with respect to FIGS. 15-18.

Other embodiments may be configured to alternatively transfer additional data from the stylus 1300 to the sensing device (not shown) without modulating the stylus TX signal 835. For example, using time division multiplexing ("TDM"), the stylus 1300 transmits the stylus TX signal 898 in one time slot, and transmits the additional data (e.g., force data, acceleration data) in another time slot, as described with respect to FIG. 19. Similarly, code division multiplying (CDM) may be used to transmit the stylus TX signal and the additional data. The stylus 1300 may transmit the stylus TX signal 898 using one code, and may transmit the additional data using another code. In an embodiment, the stylus TX signal 898 and additional data may utilize the same frequency or different frequencies. In other embodiments, optical, ultrasonic, inductive, or RF signal transmissions may be utilized to transfer the additional data from the stylus 1300 to the sensing device 830. For example, additional data may be wirelessly coupled from the stylus 1300 to the sensing device 830. It should be noted that additional hardware, such as antennas and/or amplifiers, may be required to transmit the additional data to the sensing device 830. Such embodiments would be known by those of ordinary skill in the art with the benefit of this disclosure.

Figure 14:
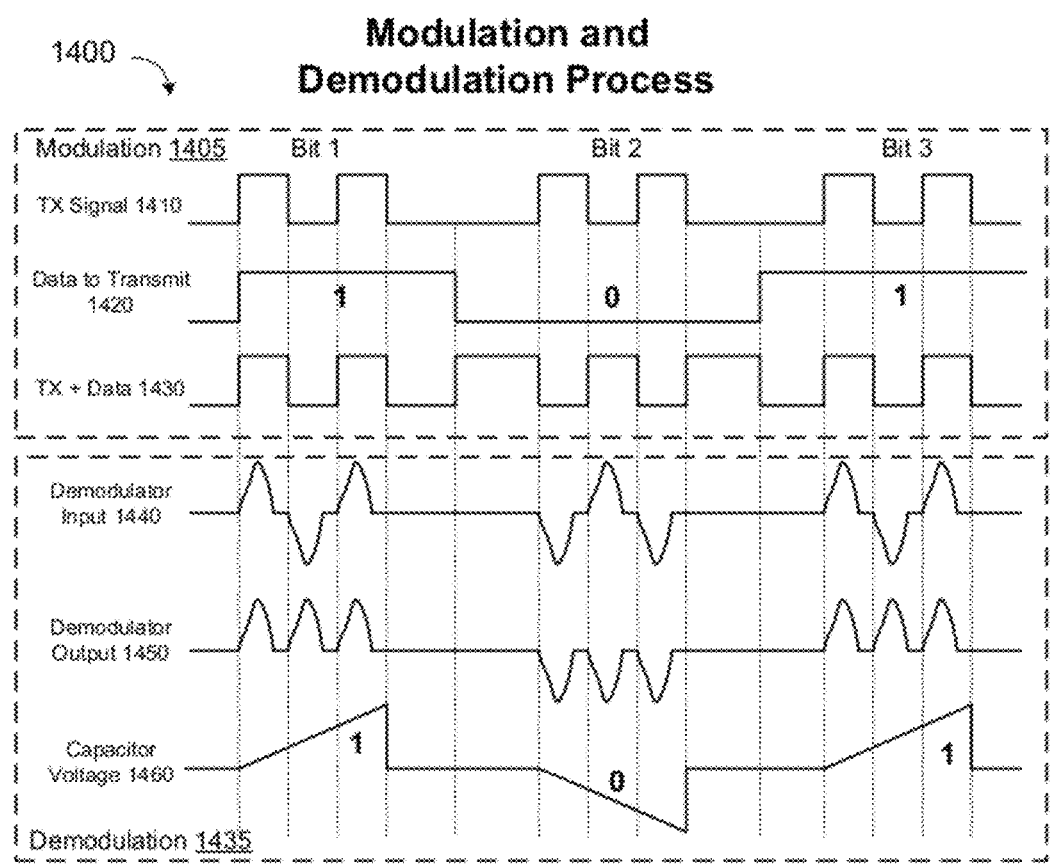
FIG. 14 is a timing diagram illustrating a modulation and demodulation process on a data stream, according to an embodiment of the invention.

FIG. 14 is a timing diagram 1400 illustrating a modulation and demodulation process on a data stream, according to an embodiment of the invention. Timing diagram 1400 includes a modulation process 1405 and demodulation process 1435. The modulation process 1405 includes TX data signal 1410, data-to-transmit signal 1420, and TX+Data signal 1430. The demodulation process 1435 includes demodulator input signal 1440, demodulator output signal 1450, and capacitor voltage 1460.

In an embodiment, the TX data signal 1410 and data-to-transmit signal 1420 are a stylus TX signal and additional data (e.g., force sense, button, battery data), as described above in conjunction with FIG. 13. The TX+Data signal 1430 is a modulated TX signal containing information from both the TX signal and the data to transmit (e.g., force data, button data, etc.). In an embodiment, the TX and Data signal 1430 pulses are inverted or non-inverted depending on the data-to-transmit signal bits 1420. In one embodiment, the TX+Data signal 1430 is capacitively coupled from the stylus tip 895 to the ITO array 810. Alternatively, the TX+Data signal 1430 is wirelessly coupled from the stylus to the sensing device 830.

In an embodiment, the TX+data signal 1430 arrives at a demodulator block in the form of current spikes, as illustrated by demodulator input 1440. The synchronous detector output signal (demodulator output 1450) consists of positive or negative rectifier spikes correlating to the modulated additional data. The receiver demodulator integration capacitor (not shown on the circuit diagrams) voltages 1460 represent the decoded data bits that correspond to the data-to-transmit 1420 signal, which is further processed by the sensing device 830.

Figure 15C:
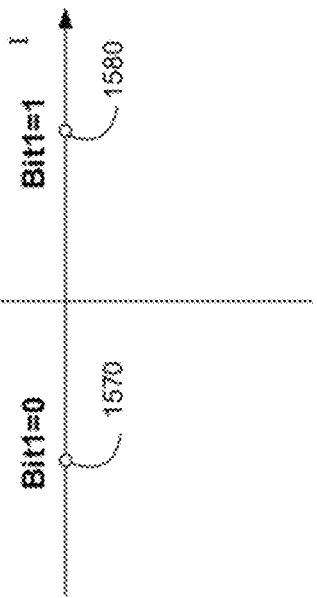
FIG. 15C is a graph illustrating polar coordinates and phase relationships for a one-bit BPSK modulation scheme, according to an embodiment of the invention.
Figure 15A:
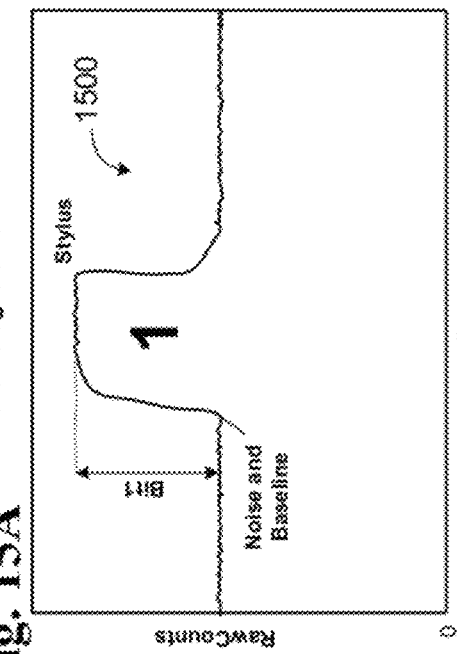
FIG. 15A is a waveform illustrating a stylus TX signal utilizing a one-bit, binary phase shift keyed ("BPSK") modulation scheme, according to an embodiment of the invention.
Figure 15B:
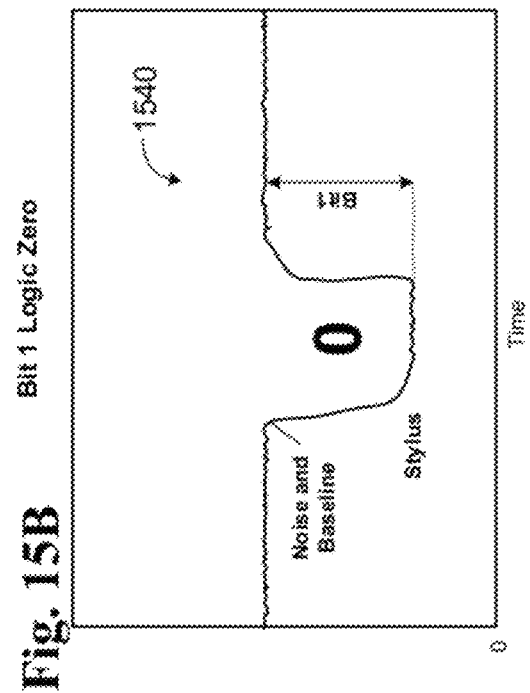
FIG. 15B is a waveform illustrating a stylus TX signal utilizing a one-bit BPSK modulation scheme, according to an embodiment of the invention.

FIG. 15A is a waveform 1500 illustrating a stylus TX signal utilizing a one-bit, binary phase shift keyed ("BPSK") modulation scheme, according to an embodiment of the invention. BPSK utilizes one bit with two logic states (binary signal) which are represented as positive and negative pulses that are 180 degrees out of phase with each other. Waveform 1500 illustrates a logic pulse representing a logic level "1." FIG. 15B is a waveform 1540 illustrating a stylus TX signal utilizing a one-bit BPSK modulation scheme, according to an embodiment of the invention. Waveform 1540 illustrates a logic pulse representing a logic level "0." FIG. 15C is a graph 1560 illustrating polar coordinates and phase relationships for a one-bit BPSK modulation scheme, according to an embodiment of the invention. In an embodiment, a single bit ("Bit 1") may be represented as a positive or negative signal. Bit 1 1580 is a logic level "1" with a zero degree phase shift. Bit 1 1570 is a logic level "0" with a 180 degree phase shift. In an embodiment, BPSK may be used to modulate additional data into the stylus TX signal 898 as described above with reference to FIG. 8. For example, button data may be encoded by BPSK. A pressed and non-pressed button is represented in polar coordinates by Bit 1 1570 and Bit 1 1580, respectively. It should be noted that changing the phase of the TX signal to incorporate additional data will not necessarily change the timing, absolute magnitude, or frequency of the TX signal. In other words, the timing and synchronization information contained in the stylus TX signal 898 may remain unchanged despite a change in signal phase. As described above, BPSK modulation is one of several preferred modulation schemes for adding additional data to a stylus TX signal. BPSK may allow for reliable detection at a low signal-to-noise ratio and may reduce data transmission overhead for a stylus. Other modulation schemes may be used as would be known by one of ordinary skill in the art with the benefit of this disclosure.

Figure 16:
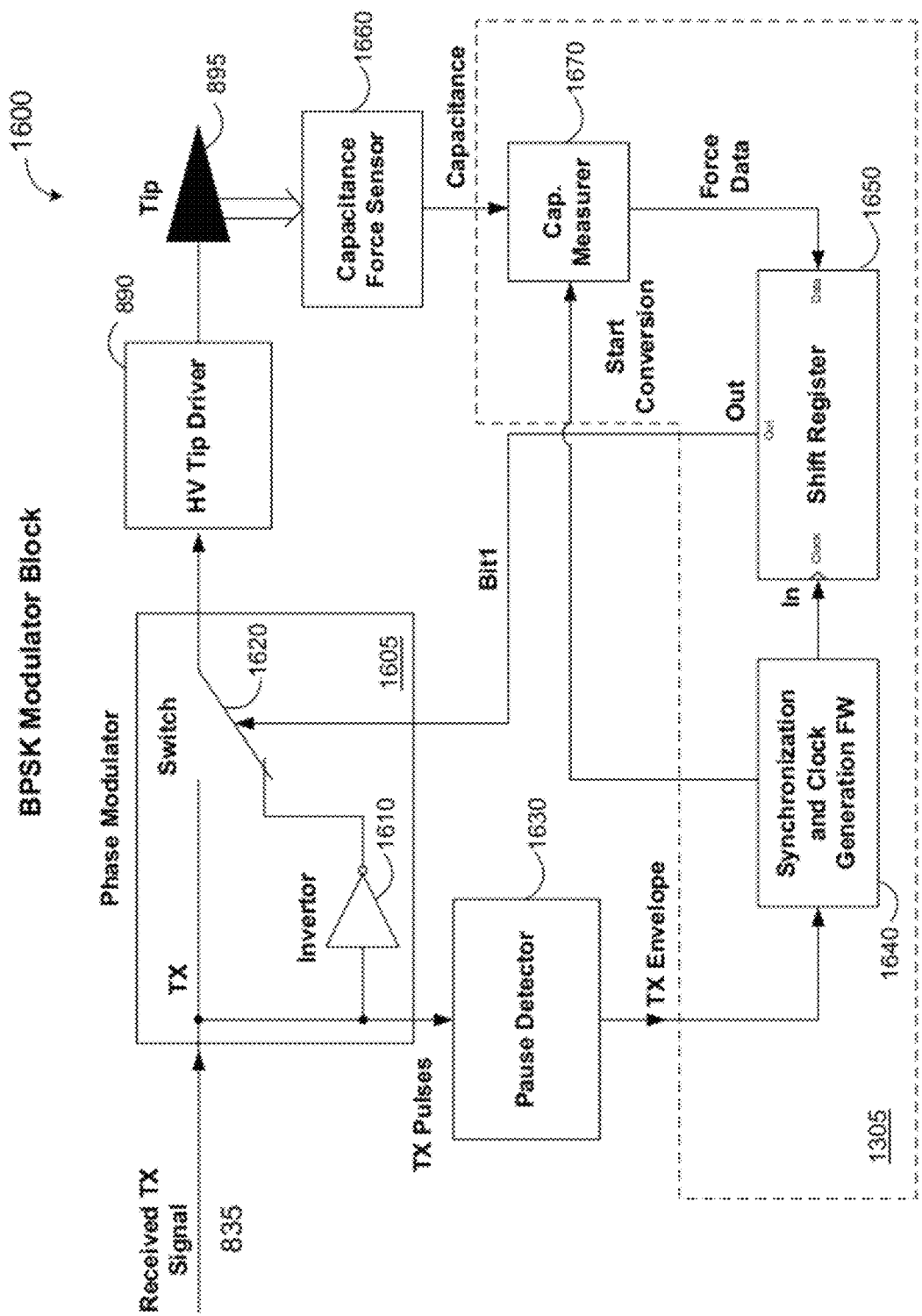
FIG. 16 is a block diagram illustrating a modulator block for implementing a one-bit BPSK modulation scheme for adding force sense data to a stylus TX signal, according to an embodiment of the invention.

FIG. 16 is a block diagram illustrating a modulator block 1600 for implementing a one-bit BPSK modulation scheme for adding force sense data to a stylus TX signal 835, according to an embodiment of the invention. The modulator block 1600 includes switching block 1605, pause detector 1630, synchronization and clock generation firmware ("synchro clock gen") 1640, shift register 1650, capacitance force sensor 1660, capacitance measurer 1670, high voltage tip driver 890, and stylus tip 895. The switching block 1605 includes an inverter 1610 and switch 1620. In an embodiment, the modulator block is part of the synch mod block 1350 of FIG. 13. In another embodiment, the capacitance measurer 1670, the shift register, and synchro clock gen 1640 are implemented in the microcontroller block 1305. Alternatively, the microcontroller block 1305 may include more or less components to modulate data in the stylus TX signal 835.

In operation, the switching block 1605 is configured to controllably toggle switch 1620 to generate an inverted or non-inverted TX signal 835. The inverted stylus TX signal 835 is generated by the inverter 1610. In an embodiment, the inverted and non-inverted signals of switching block 1610 are the zero and 180 degree phase shifted BPSK signals illustrated in FIGS. 15A-C.

The modulator block 1600 incorporates force sensing into the TX signal 835. Force sensing is detected, in part, by an actuator (not shown) and the capacitance force sensor 1660, and is further described above in conjunction with FIG. 13. It should be noted that other types of additional data may be modulated into the stylus TX signal 835, as would be appreciated by one of ordinary skill in the art with the benefit of this disclosure.

In an embodiment, switch 1620 timing is controlled by the pause detector 1630, synch clock gen 1640 and shift register 1650. The modulator block 1600 is configured to toggle the switch 1620 between stylus TX signal 835 pulses. It should be noted that toggling the switch 1620 during stylus TX pulses may cause distortion and adversely affect the synchronization of the stylus 850 and ITO array 810. The pause detector 1630 detects the period between stylus TX pulses. The synch clock gen 1640 provides a synchronization and clock generation algorithm to generate synchronized clock pulses to the shift register 1650. The shift register 1650 controllably toggles the switch 1620 in response to the input force data from capacitance measurer 1670, resulting in a modulated stylus TX signal. Thus, the resulting stylus TX signal 898 at stylus tip 895 retains its timing information for host-stylus synchronization with additional force data via the phase modulation techniques described herein.

In one embodiment, when no modulation of additional data is required on the stylus TX signal, the switching block 1605 sends the stylus TX signal to the tip driver 890 with no phase modulation. In an embodiment, the switching block 1605 may be bypassed if no modulation of additional data in the stylus TX signal 898 is required.

FIG. 17A is a waveform 1700 illustrating a stylus TX signal utilizing a two-bit, quadrature phase shift keyed ("QPSK") modulation scheme, according to an embodiment of the invention. In QPSK, two bits (Bit1 and Bit2) are transmitted at the same time and may be modulated by phase or delay, as described below with reference to FIG. 17C. Waveform 1700 illustrates two logic states for two logic pulses where Bit1=1 and Bit2=1 or 0. The Bit2 logic states differ by signal magnitude due to a TX/4 delay, as further described below. It should be noted FIG. 17A shows that the bit states are different from commonly used quadrature detectors diagrams, since there is no quadrature channel here. In this embodiment, the stylus signal phase is pre-defined as compared to the receiver's synchronous demodulator reference signal phase due to the synchronization between the stylus and host controller.

FIG. 17B is a waveform 1740 illustrating a stylus TX signal utilizing a two-bit quadrature phase shift keyed ("QPSK") modulation scheme, according to an embodiment of the invention. Waveform 1740 illustrates two logic states for two logic pulses where Bit1=0 and Bit2=1 or 0. FIG. 17C is a graph 1760 illustrating polar coordinates and phase relationships for a two-bit QPSK modulation scheme, according to an embodiment of the invention. As described above with respect to FIG. 15C, Bit 1 1775 is a logic level "1" with a zero degree phase shift and Bit 1 1770 is a logic level "0" with a 180 degree phase shift. In an embodiment, Bit 2 may have a TX/4 time delay that results in reduced amplitude at the demodulator output (not shown). The reduced amplitude is approximately one-half the magnitude of a non-delayed signal, as shown in FIGS. 17A and 17B.

Figure 18:
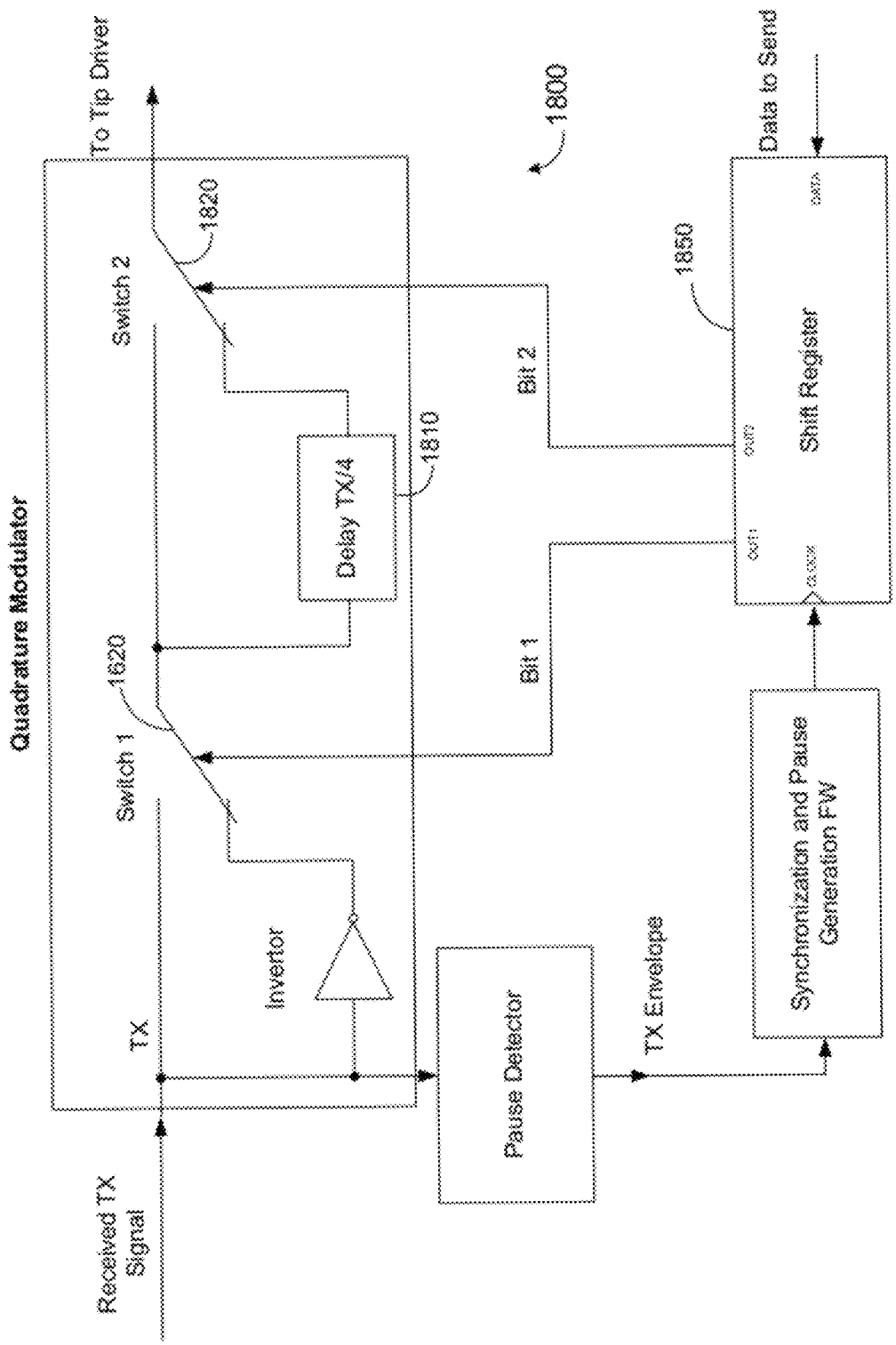
FIG. 18 is a block diagram illustrating a modulator block for implementing a two-bit QPSK modulation scheme for adding additional data to a stylus TX signal, according to an embodiment of the invention.

FIG. 18 is a block diagram illustrating a modulator block 1800 for implementing a two-bit QPSK modulation scheme for adding additional data to a stylus TX signal 835, according to an embodiment of the invention. Modulator block 1800 is similar to modulator block 1600 of FIG. 16, with the addition of a delay block 1810 and a second switch 1820 controllably toggled by 2-bit shift register 1850. The two bits may be transmitted at the same time. One bit may be coded in the same way by switch 1 1620. Fully inverted or non inverted signal means logic zero or one. The second bit may be coded by changing the absolute value of the capacitor voltage 1460. The receiver may use synchronous rectifier topology. If received TX signal is shifted by +/−90 degrees, then resulting received amplitude is two times lower. The switch 2 1820 adds or removes 90 degrees (or TX/4) delay.

Figure 19A:
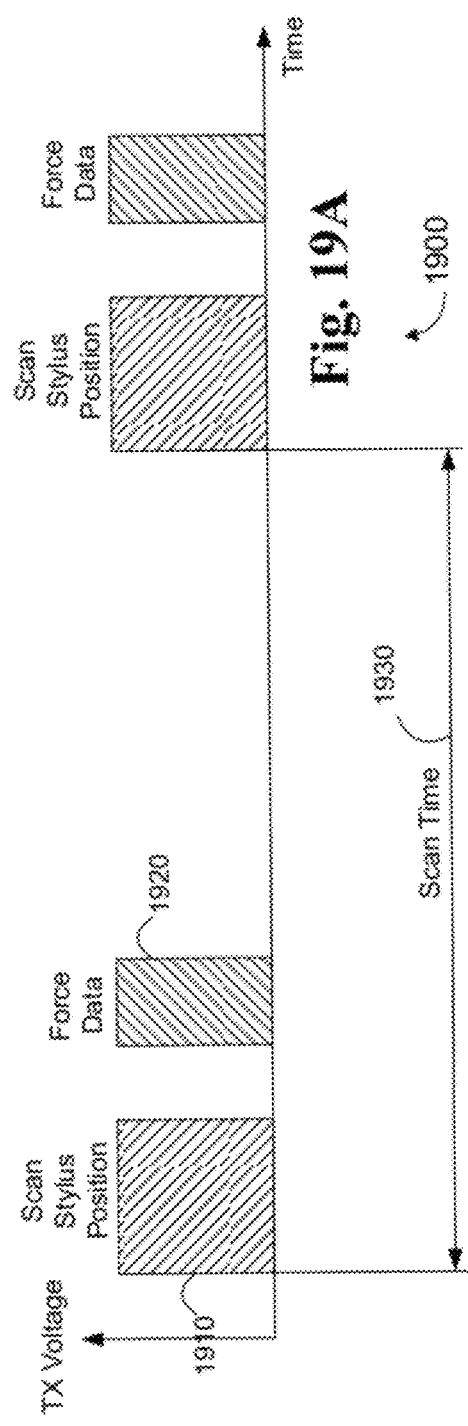
FIG. 19A is a timing diagram for a host device configured to transmit stylus position data and force data during separate intervals, according to an embodiment of the invention.

FIG. 19A is a timing diagram 1900 for a host device configured to transmit stylus position data and force data during separate intervals, according to an embodiment of the invention. The timing diagram 1900 includes stylus position scan interval 1910 and force data interval 1920. The scan time 1930 is the time interval from the start of one stylus position scan to the start of the next stylus position scan. In an embodiment, other types of additional data may be included (e.g., button data, battery data, acceleration data, etc.) as would be appreciated by one of ordinary skill in the art.

In an embodiment, the host utilizes the interval between the end of one stylus position scan to the beginning of the next stylus position scan to synchronize the host and stylus to provide robust data transfer and error-free stylus position tracking. By transmitting force data separately in time (e.g., time division multiplexing the stylus TX signal and force data), less time is available in the scan time 1930 for the host device to perform the synchronization and tracking operations. In an embodiment, an increased scan time (i.e., reduced system operating frequency) may be needed. It should be noted that high bit rates may be achieved with this method. In an embodiment, 16 bits are transferred per scan time interval. Alternatively, less or more than 16 bits may be transferred per scan time interval.

Figure 19B:
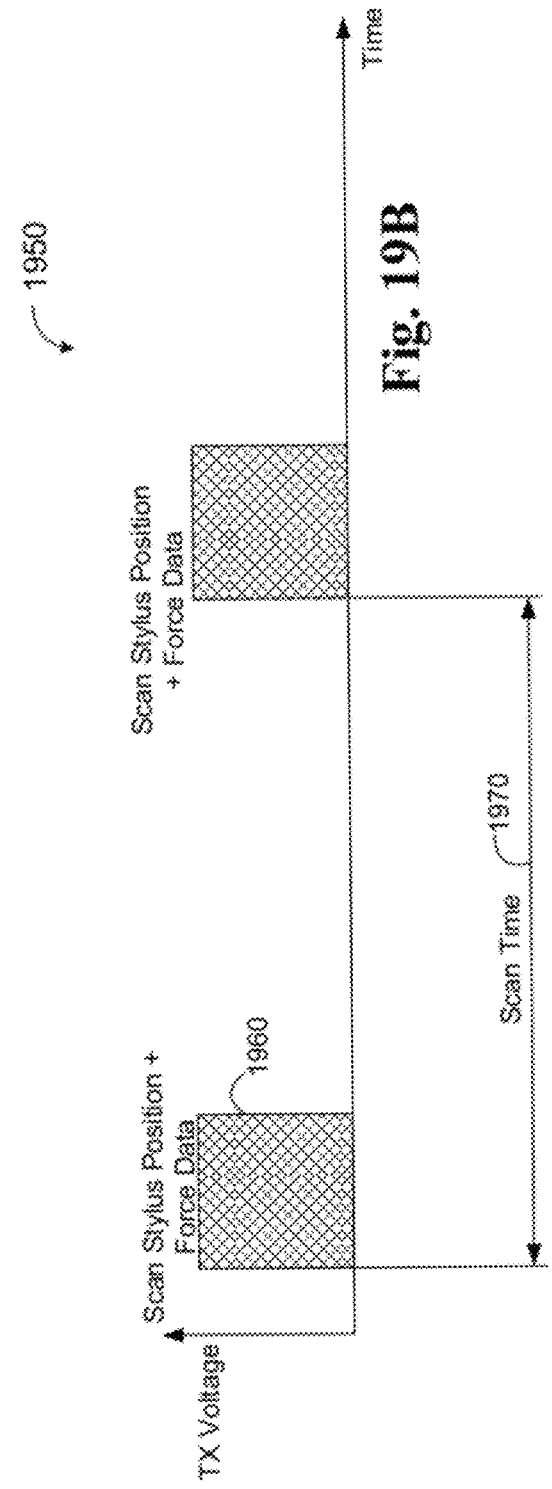
FIG. 19B is a timing diagram for a host device configured to transmit stylus position data and force data during the same interval, according to an embodiment of the invention.

FIG. 19B is a timing diagram 1950 for a host device configured to transmit stylus position data and force data during the same interval, according to an embodiment of the invention. The timing diagram 1950 includes a stylus position scan and force data interval 1960 and scan time interval 1970. In an embodiment, the stylus modulates one additional data bit (e.g., force data, battery data, button data, etc.) for each position scan without an increase in total scan time 1970. It should be noted that this scanning method may support lower maximum bit rates than the scanning method of FIG. 19A.

Figure 20:
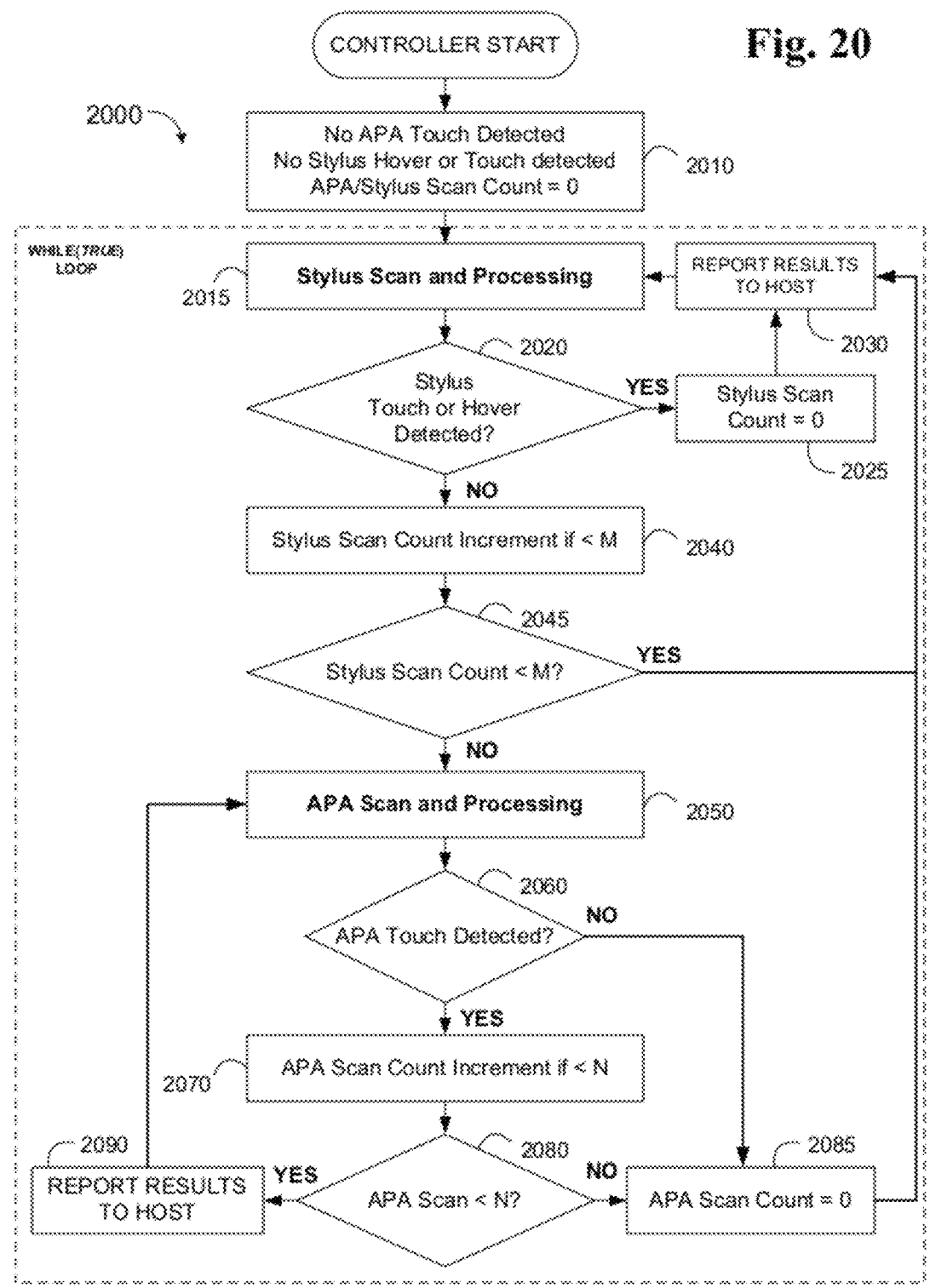
FIG. 20 is flow diagram of one embodiment of a method of tracking the position of a passive touch object and a stylus on a capacitive sense array.

FIG. 20 is flow diagram of one embodiment of a method 2000 of tracking the position of a passive touch object and a stylus on a sense array. The method 2000 is performed by processing logic that may comprise hardware (circuitry, dedicated logic, etc.), software (such as is run on a general purpose computing system or a dedicated machine), firmware (embedded software), or any combination thereof. In one embodiment, the touch screen controller 605 of FIG. 6 performs some of operations of method 2000. In another embodiment, the sensing device 830 of FIG. 8 performs the method 2000. In yet another embodiment, the capacitance sense circuit 310 of FIG. 3 performs the method 2000. Alternatively, other components of the electronic system 300 (FIG. 3) can perform some or all of the operations of method 2000.

Referring to FIG. 20, tracking begins where no APA touch (e.g., by a passive touch object) or stylus touch (including touch and hover detection) are present on a sense array (block 2010). The goal of this method is providing the adaptive active stylus and passive touch objects scanning technique. When no stylus and no touch the short burst of stylus scan cycles are executed per one APA scan (takes typically much longer time than stylus scan). This burst is used for reliable hover detection under noisy environments. If APA touch is detected, the burst of the APA scan cycles is executed to provide adequate touch response. No stylus is scanned within burst of the APA cycles when touch is detected. Once stylus is detected, it is scanned in the highest rate to get best stylus report rate, taking into account applications which use stylus are pretty sensitive to the report rate and stylus scanning has higher priority than APA scanning. There is no APA scanning while stylus touch or hover is sensed. Hover detection is further described in conjunction with FIG. 21. The processing logic initializes and sets the APA scan count and the stylus scan count to zero. The scan count determines the amount of time the processing logic remains in a particular scan setting. For example, the processing logic scans for the stylus while the scan count is less than a predetermined value. In an embodiment, the predetermined maximum scan count values for an APA touch and stylus touch are denoted as variables "N" and "M," respectively.

The stylus scan and processing begins (block 2015). In an embodiment, the stylus has a higher priority than an APA scan for a passive touch object. If at block 2020, the processing logic detects a stylus touch or stylus hover signal, the sensing device sets the stylus scan count to zero (block 2025), the processing logic reports the results to a host processor, (block 2030), and the stylus scan and processing restarts (block 2015). In an embodiment, the host processor may be host 350 of FIG. 3. If at block 2020, a stylus touch or hover is not detected, the processing logic increments the stylus scan count if the current stylus scan count value is less than the predetermined maximum value (i.e., "M"), block 2040. If the stylus scan count is less than M (block 2045), the processing logic reports the results to a host processor, (block 2030) and stylus scan and processing restarts (block 2015). If the stylus scan count is equal to or greater than M, then APA scan and processing begins (block 2050).

If at block 2060, an APA touch is not detected (e.g., a touch by a passive touch object such as a finger), the touch screen controller 605 sets the APA scan count value to zero (block 2085), the processing logic reports the results to a host processor, (block 2090) and stylus scan and processing restarts (block 2015). If at block 2060, an APA touch is detected, the processing logic increments the APA scan count if the current APA scan count is less than the predetermined maximum value (i.e., "N") (block 2070). If the APA scan count is less than N (block 2080), the processing logic reports the results to a host processor (block 2030), and APA scan and processing restarts (block 2050). If the APA scan count is equal to or greater than N, then the processing logic sets the APA scan count to zero (block 2085), the processing logic reports the results to a host processor, (block 2030) and stylus scan and processing restarts (block 2015).

In summary, the stylus scan has a higher priority than the APA scan, according to an embodiment of the invention. The stylus scan may continue in iterative scan periods until either a stylus is detected (in which case the stylus scan count is reset to zero and stylus position tracking period restarts) or until the stylus scan period ends (when the stylus scan count reaches a threshold value). The APA scan may begin once the stylus scan period ends. The APA scan may continue tracking the touch object until the APA scan period ends (scan count reaches a threshold value) or until no APA touch object is detected, whichever occurs first. Alternatively, other methods of prioritizing and substantially simultaneously tracking the position of a stylus and a passive touch object on a sense array would be known by those of ordinary skill in the art with the benefit of this disclosure.

FIG. 21 is flow diagram of one embodiment of a method 2100 of tracking the position of a stylus that is contacting or hovering over a sense array. The method 2100 is performed by processing logic that may comprise hardware (circuitry, dedicated logic, etc.), software (such as is run on a general purpose computing system or a dedicated machine), firmware (embedded software), or any combination thereof. In one embodiment, the touch screen controller 605 of FIG. 6 performs some of operations of method 2100. In another embodiment, the sensing device 830 of FIG. 8 performs the method 2100. In yet another embodiment, the capacitance sense circuit 310 of FIG. 3 performs the method 2100. Alternatively, other components of the electronic system 300 (FIG. 3) can perform some or all of the operations of method 2100.

In an embodiment, the stylus scan method 2100 describes a stylus hover detection scheme and may be substituted for the stylus scan and processing method of FIG. 20. A stylus TX hover signal occurs when a stylus tip is in close proximity to, but not touching the overlay, a sense array and the stylus capacitively couples the stylus TX signal to the sense array.

Referring to FIG. 21, the stylus scan phase begins (block 2110). The processing logic performs filtering, baseline updates, or difference calculations (block 2120). Filtering may be an infinite impulse response (IIR), a finite impulse response (FIR), or a median applied to the raw data, depending on the noise environment and allowable processing overhead. Difference calculations may be used as a method of extracting usable signals from background noise. A baseline is maintained for each sense element over time, tracking its response to temperature, noise etc. This baseline is subtracted from each raw data sample to obtain "difference counts". In other words DIFF_COUNTS=RAW_COUNTS−BASELINE. The difference calculation may be used for distinguishing the stylus signal from the receiver baseline signal at the absence signal from stylus. The baseline is calculated as low pass filtered receiver signal when no stylus is detected. To improve the signal-to-noise ratio under noisy conditions the receiver signal could be filtered optionally. The filters are low-pass filters, common-mode noise filters, or the like. At block 2130, if the difference calculation for the entire sensors array is zero, then the processing logic does not detect a stylus touch or stylus hover condition (block 2135) and the stylus process ends (block 2195). This means that all measured difference counts were zero, i.e., there was no stylus touch detected.

At block 2130, if the difference calculation for the entire APA is greater than zero, the processing logic determines the local maximum stylus TX signal (block 2140). In an embodiment, the local maximum stylus TX signal is the row or column of electrodes that have the highest amplitude stylus TX signal. In an embodiment, the row and column electrodes are RX lines 640 and 660 of FIG. 6. At block 2150, if the sum of the difference calculation around the local maximum is less than a hover threshold value, then processing logic detects a stylus touch (block 2155). For example, a typical stylus touch signal may look like signal 2152. At block 2190, the processing logic calculates the centroid in post processing and stylus processing ends (block 2195).

At block 2150, if the sum of the difference calculation around the local maximum is equal to or greater than the hover threshold value, then the hover differential signal shape detector ("shape detector") detects the shape (i.e., the signal gradient) of the stylus TX signal on the sense array (process block 2160). The shape detector determines if the relative magnitudes of the stylus TX signal on the RX lines 640, 660 adjacent to the electrode with the local maximum are indicative of a hovering stylus TX signal. The magnitude of the coupled stylus TX signal depends on the relative proximity of the stylus tip 895 and the electrodes on the sense array 810. In an embodiment, a hovering stylus TX signal may look like signal 2164. Alternatively, a signal attributable to noise or other non-stylus TX signal may look randomly shaped, similar to signal 2162.

The shape detector determines if the detected signal is a legitimate hovering stylus TX signal from a hovering stylus (block 2170). If the shape detector determines that the detected is a legitimate hovering stylus TX signal, the processing logic determines the current stylus count. At block 2180, if the stylus count is less than a predetermined count value, the processing logic determines that there is no stylus touch or stylus hover signal on the sense array (block 2175) and stylus processing ends (block 2195). At block 2180, if the stylus count is equal to or greater than the predetermined count value, the processing logic determines that the signal is a stylus hover TX signal (block 2185). At block 2190, the processing logic calculates the centroid in post processing and stylus processing ends, block 2195.

If the shape detector determines that the detected signal is not a legitimate stylus hover TX signal (e.g., signal 2162), the processing logic determines that no stylus touch occurred (block 2175) and stylus processing ends (block 2195).

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
   a capacitive sense array and a processing device;
   wherein:
   the capacitive sense array is configured to detect a presence of a passive touch object or a stylus, wherein the capacitive sense array is configured to receive a first transmission signal from the stylus via capacitive coupling between the capacitive sense array and the stylus to detect the presence of the stylus, and receive a second transmission signal from the processing device to detect the presence of the passive touch object;
   the processing device is coupled to the capacitive sense array, and configured to wirelessly transmit a synchronization signal to the stylus via a wireless communication link, and determine the stylus location on the capacitive sense array based on the first transmission signal;
   the first transmission signal is modulated from the synchronization signal by incorporating additional data associated with the stylus into the synchronization signal, wherein the additional data includes stylus acceleration data; and
   in accordance with modulation of the synchronization signal, time periods of the first transmission signal are synchronized to time periods of the second transmission signal, such that the first transmission signal is transmitted to and received at the capacitive sense array during time periods when the second transmission signal is not transmitted by the processing device.

2. The apparatus of claim 1, wherein the first transmission signal is substantially identical to the synchronization signal.

3. The apparatus of claim 1, wherein the capacitive sense array is further configured to operate as a mutual capacitive sense array in a first mode, and as a coupled-charge receiver in a second mode.

4. The apparatus of claim 1, wherein the processing device is further configured to substantially simultaneously track the position of both the passive touch object and the stylus on the capacitive sense array.

5. The apparatus of claim 4, wherein the capacitive sense array is further configured to operate as a mutual capacitive sense array during the tracking of the position of the passive touch object in a first mode, and wherein the capacitive sense array is configured to operate as a coupled-charge receiver during the tracking of the position of the stylus in a second mode.

6. The apparatus of claim 1, wherein the capacitive sense array comprises row electrodes and column electrodes, and the processing device is further configured to track the position of the stylus using both the row electrodes and the column electrodes as receive electrodes, and to track the position of the passive touch object using the row electrodes or the column electrodes as the receive electrodes.

7. The apparatus of claim 1, wherein the processing device comprises a demodulation block to extract the additional data that is modulated into the synchronization signal by the stylus.

8. The apparatus of claim 7, wherein the demodulation block is further configured to extract the additional data by demodulating the first signal by at least one of amplitude shift keying, frequency shift keying, binary phase shift keying, or quadrature phase shift keying.

9. The apparatus of claim 1, wherein the processing device is further configured to retrieve additional data that is time division multiplexed (TDM) in the first transmission signal.

10. The apparatus of claim 1, wherein the additional data further includes battery status data.

11. The apparatus of claim 1, wherein the additional data further includes a magnitude of force applied to a tip of the stylus.

12. A method comprising:
    at a processing device coupled to a capacitive sense array that is configured to detect a presence of a passive touch object or a stylus:
    wirelessly transmitting a synchronization signal to the stylus via a wireless communication link;
    determining that the capacitive sense array receives a first transmission signal from the stylus via capacitive coupling between the capacitive sense array and the stylus for detecting the presence of the stylus, wherein:
    the capacitive sense array is further configured to receive a second transmission signal from the processing device to detect the presence of the passive touch object;
    the first transmission signal is modulated from the synchronization signal by incorporating additional data associated with the stylus into the synchronization signal, wherein the additional data includes stylus acceleration data; and
    in accordance with modulation of the synchronization signal, time periods of the first transmission signal are synchronized to time periods of the second transmission signal, such that the first transmission signal is transmitted to and received at the capacitive sense array during time periods when the second transmission signal is not transmitted by the processing device; and
    determining the stylus location on the capacitive sense array based on the first transmission signal.

13. The method of claim 12, wherein the capacitive sense array is configured to operate in the first mode for a finger position tracking of the touch object and the second mode for the stylus position tracking of the stylus, further comprising:
    switching the capacitive sense array between the first mode and the second mode after the synchronization.

14. The method of claim 12, wherein the capacitive sense array includes row electrodes and column electrodes, the method further comprising:
- receiving the first transmission signal from the stylus using both the row electrodes and the column electrodes in a second mode for a stylus position tracking of the stylus; and
- receiving the second transmission signal using one of the row electrodes or the column electrodes in a first mode for finger position tracking of the touch object, wherein the first and second transmission signals are synchronized to each other, and received at distinct electrodes of the capacitive sense array.

15. The method of claim 14, further comprising:
- performing the finger position tracking;
- performing the stylus position tracking substantially simultaneously with the performing of the finger position tracking; and
- differentiating the positions of the stylus and the touch object using at least one of frequency modulation, amplitude modulation, phase modulation, or code modulation.

16. The method of claim 14, wherein differentiating the positions of the stylus and touch object further comprises demodulating the second transmission signal to extract the additional data that is modulated into the second transmission signal by at least one of amplitude shift keying, frequency shift keying, binary phase shift modulation, or quadrature phase shift modulation.

17. The method of claim 12, wherein wirelessly transmitting a synchronization signal further comprises:
- generating a carrier signal by the processing device;
- modulating the carrier signal with the synchronization signal by the processing device; and
- transmitting the modulated synchronization signal from the processing device to the stylus.

18. The method of claim 12, wherein the additional data further includes battery status data.

19. The method of claim 12, wherein the additional data further includes a magnitude of force applied to a tip of the stylus.

20. A system comprising:
a capacitive sense array, a stylus and a processing device; wherein:
- the capacitive sense array is configured to detect a presence of a passive touch object or the stylus, wherein the capacitive sense array is configured to receive a first transmission signal from the stylus via capacitive coupling between the capacitive sense array and the stylus to detect the presence of the stylus, and receive a second transmission signal from the processing device to detect the presence of the passive touch object;
- the processing device is coupled to the capacitive sense array, and configured to wirelessly transmit a synchronization signal to the stylus via a wireless communication link, and determine the stylus location on the capacitive sense array based on the first transmission signal;
- the first transmission signal is modulated from the synchronization signal by incorporating additional data associated with the stylus into the synchronization signal, wherein the additional data includes stylus acceleration data; and
- in accordance with modulation of the synchronization signal, time periods of the first transmission signal are synchronized to time periods of the second transmission signal, such that the first transmission signal is transmitted to and received at the capacitive sense array during time periods when the second transmission signal is not transmitted by the processing device.

* * * * *